United States Patent
Hiramoto

(10) Patent No.: US 10,152,287 B2
(45) Date of Patent: Dec. 11, 2018

(54) PRINTING CONTROL APPARATUS, PRINTING CONTROL SYSTEM, AND PRINTING CONTROL METHOD

(71) Applicant: Kohsuke Hiramoto, Kanagawa (JP)

(72) Inventor: Kohsuke Hiramoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/632,565

(22) Filed: Jun. 26, 2017

(65) Prior Publication Data

US 2018/0004467 A1 Jan. 4, 2018

(30) Foreign Application Priority Data

Jun. 30, 2016 (JP) .................................. 2016-129703
Apr. 27, 2017 (JP) .................................. 2017-088723

(51) Int. Cl.
*G06F 15/00* (2006.01)
*G06F 3/12* (2006.01)
*G06K 1/00* (2006.01)
*G03G 15/00* (2006.01)
*B41J 13/00* (2006.01)

(52) U.S. Cl.
CPC ....... *G06F 3/1279* (2013.01); *G03G 15/5087* (2013.01); *G03G 15/5095* (2013.01); *G06F 3/1203* (2013.01); *G06F 3/1258* (2013.01); *G06F 3/1285* (2013.01); *B41J 13/0036* (2013.01); *G06F 3/1264* (2013.01)

(58) Field of Classification Search
CPC .... G06F 3/1279; G06F 3/1258; G06F 3/1285; B41J 13/0036

USPC ...................... 358/1.13, 1.15, 1.14, 1.1, 1.18
See application file for complete search history.

(56) References Cited

U.S. PATENT DOCUMENTS

2009/0021772 A1* 1/2009 Salgado ................ G06F 3/1205
    358/1.15
2012/0250045 A1* 10/2012 Uemura ................ G06F 3/1208
    358/1.9

FOREIGN PATENT DOCUMENTS

JP    2005-200109    7/2005
JP    2009-126101    6/2009

* cited by examiner

*Primary Examiner* — Douglas Tran
(74) *Attorney, Agent, or Firm* — Oblon, McClelland, Maier & Neustadt, L.L.P.

(57) ABSTRACT

An information processing apparatus includes: a receiver to receive from a terminal device, for each page of an image to be printed with an image processing device, one-page data included in electronic data of the image to be printed; and circuitry to: determine whether an output destination device to which a print medium having the printed image is output has been changed and whether a medium size of the print medium has been changed to generate a first determination result; request the image processing device to determine whether the output destination device permits mixture of different medium sizes to obtain a second determination result when the first determination result indicates that at least one of the output destination device and the medium size has been changed; and output a notification when the second determination result indicates that the output destination device does not permit the mixture of the different medium sizes.

12 Claims, 23 Drawing Sheets

FIG. 6

| JOB ID | PAGE ID | PAPER EJECTION TRAY TO BE USED | PAPER SIZE | ... |
|---|---|---|---|---|
| ... | ... | ... | ... | ... |

| | | | 3000 |
|---|---|---|---|
| PAPER EJECTION TRAY 1 | PAPER EJECTION TRAY 2 | PAPER EJECTION TRAY 3 | ... |
| TRUE | FALSE | TRUE | ... |

PAPER EJECTION TRAY INFORMATION

FIG. 17

| PAPER EJECTION TRAY 1 | PAPER EJECTION TRAY 2 | PAPER EJECTION TRAY 3 | ... |
|---|---|---|---|
| TRUE | FALSE | TRUE | ... |
| PAPER WIDTH REFERENCE VALUE = x1 | PAPER WIDTH REFERENCE VALUE = x2 | PAPER WIDTH REFERENCE VALUE = x3 | ... |
| PAPER LENGTH REFERENCE VALUE = y1 | PAPER LENGTH REFERENCE VALUE = y2 | PAPER LENGTH REFERENCE VALUE = y3 | ... |

3000A

PAPER EJECTION TRAY INFORMATION

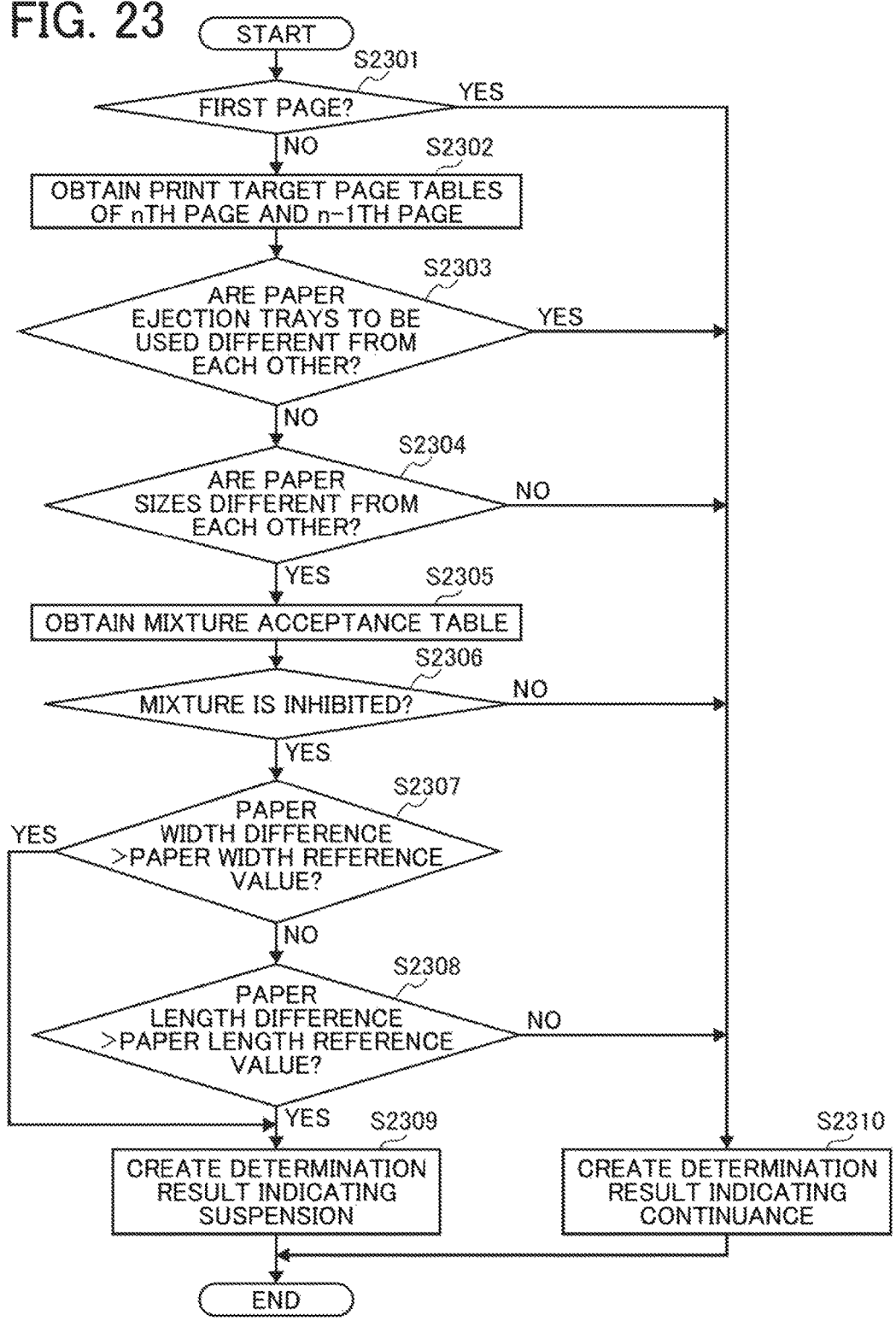

PRINTING CONTROL APPARATUS, PRINTING CONTROL SYSTEM, AND PRINTING CONTROL METHOD

CROSS-REFERENCE TO RELATED APPLICATIONS

This patent application is based on and claims priority pursuant to 35 U.S.C. § 119(a) to Japanese Patent Application Nos. 2016-129703, filed on Jun. 30, 2016, and 2017-088723, filed on Apr. 27, 2017, in the Japan Patent Office, the entire disclosure of which is hereby incorporated by reference herein.

BACKGROUND

Technical Field

The present invention relates to an information processing apparatus, an information processing system, and an information processing method.

Description of the Related Art

In a printing work such as production printing, there is a case where a paper ejection device with a large capacity referred to as a stacker is used to store a large number of printed matters. A print job created by a user is printed on a paper sheet by a printer and stacked on the stacker.

Also, a technique has been known for making the user select whether the printed matter of the next print job is ejected to the same stacker in a state where the printed matter of the preceding print job is stacked on the stacker.

SUMMARY

Example embodiments of the present invention include an information processing apparatus, which includes: a receiver to receive from a terminal device, for each page of an image to be printed with an image processing device, one-page data included in electronic data of the image to be printed; and circuitry to: determine whether an output destination device to which a print medium having the printed image is output has been changed and whether a medium size of the print medium has been changed to generate a first determination result; request the image processing device to determine whether the output destination device permits mixture of different medium sizes to obtain a second determination result when the first determination result indicates that at least one of the output destination device and the medium size has been changed; and output a notification when the second determination result indicates that the output destination device does not permit the mixture of the different medium sizes.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a diagram of an exemplary print target page table;

FIG. 11 is a diagram of an exemplary mixture acceptance table according to an embodiment;

FIG. 17 is a diagram of an exemplary mixture acceptance table according to the second embodiment;

FIG. 23 is a flowchart of exemplary stacker usage determining processing.

Figure 1:
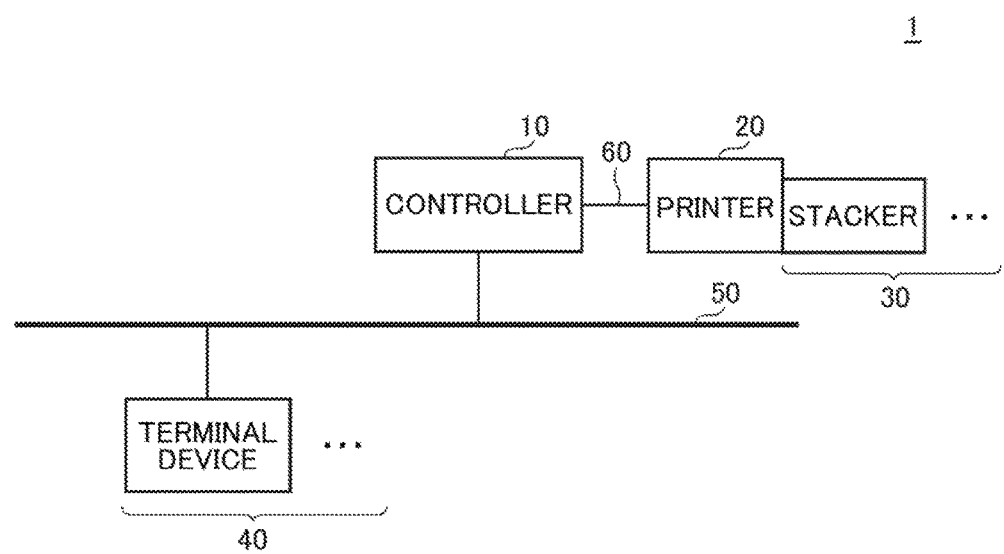
FIG. 1 is a diagram of a system configuration of an exemplary printing system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention are described in detail below with reference to the drawings.

First, a system configuration of a printing system 1 according to the present embodiment is described with reference to FIG. 1. FIG. 1 is a diagram of a system configuration of an exemplary printing system 1 according to the present embodiment.

As illustrated in FIG. 1, the printing system 1 according to the present embodiment includes a controller 10, a printer 20, one or more stackers 30, and one or more terminal devices 40. Here, the controller 10 and the terminal device 40 are communicably connected to each other via a network 50 such as a local area network (LAN). Also, the controller 10 and the printer 20 are communicably connected to each other via a dedicated line 60.

The controller 10 is, for example, a digital front end (DFE) and is an information processing apparatus which performs raster image processor (RIP) processing. That is, the controller 10 receives a print request of a page to be printed from the terminal device 40 as a print job. The controller 10 performs the RIP processing to the page to be printed included in the print request and creates a print page.

The page to be printed is data of one page (page data) included in electronic data to be printed specified by a user. Also, print data is raster image data and the like created by performing the RIP processing to the page to be printed.

At this time, in a case where the paper ejection destinations (an example of output destinations) of the printed matters are the same stacker 30, the controller 10 according to the present embodiment determines, for example, whether the paper size of an n−1th page to be printed is different from the paper size of a nth page to be printed. Then, in a case where the paper sizes are different from each other and the stacker 30 to be the paper ejection destination of the printed matter does not permit the mixture of the different paper sizes, the controller 10 according to the present embodiment displays a predetermined warning screen on the controller 10 or the terminal device 40. The predetermined warning screen may be displayed on both the controller 10 and the terminal device 40. The image of the warning screen may be previously stored in any desired memory.

In this way, in a case where the stacker 30 which does not permit the mixture of the different paper sizes is the paper ejection destination and in a case where the different paper sizes are mixed, the controller 10 according to the present embodiment previously displays a warning screen. With this warning screen, for example, the user removes the printed matter from the stacker 30 and cancels the print job not to mix the printed matters having different paper sizes.

The printer 20 is, for example, a multifunction peripheral and a digital printer. The printer 20 is an image forming apparatus which prints the print page created by the RIP processing and the like by the controller 10 to a print medium such as a paper sheet. The printer 20 ejects the printed matter created by printing the print page on the print medium to the stacker 30 connected to the printer 20.

Also, the printer 20 according to the present embodiment determines whether stacker 30 to be the paper ejection destination of the printed matter permits the mixture of the different paper sizes in response to a request from the controller 10.

The description is made as assuming that the printer 20 according to the present embodiment creates the printed matter by using a paper sheet as the print medium and ejects the printed matter to the stacker 30. However, the print medium is not limited to paper. The printer 20 may use, for example, cloth, a sheet material such as resin, plastic, copper foil, and prepreg as a print medium. Therefore, the printer 20 may eject the printed matter created by performing printing to these print media to the stacker 30.

The terminal device 40 is an information processing apparatus operated by a user such as a notebook personal computer (PC), a desktop PC, a smartphone, a tablet terminal, and a mobile phone. The user operates the terminal device 40 to instruct to print desired electronic data so as to create the print job.

The printing system 1 illustrated in FIG. 1 is an example and may have the other configuration. For example, the printing system 1 may have a structure which does not include the terminal device 40. Also, for example, the printing system 1 may have a structure including a plurality of controllers 10 and a plurality of printers 20.

Figure 2:
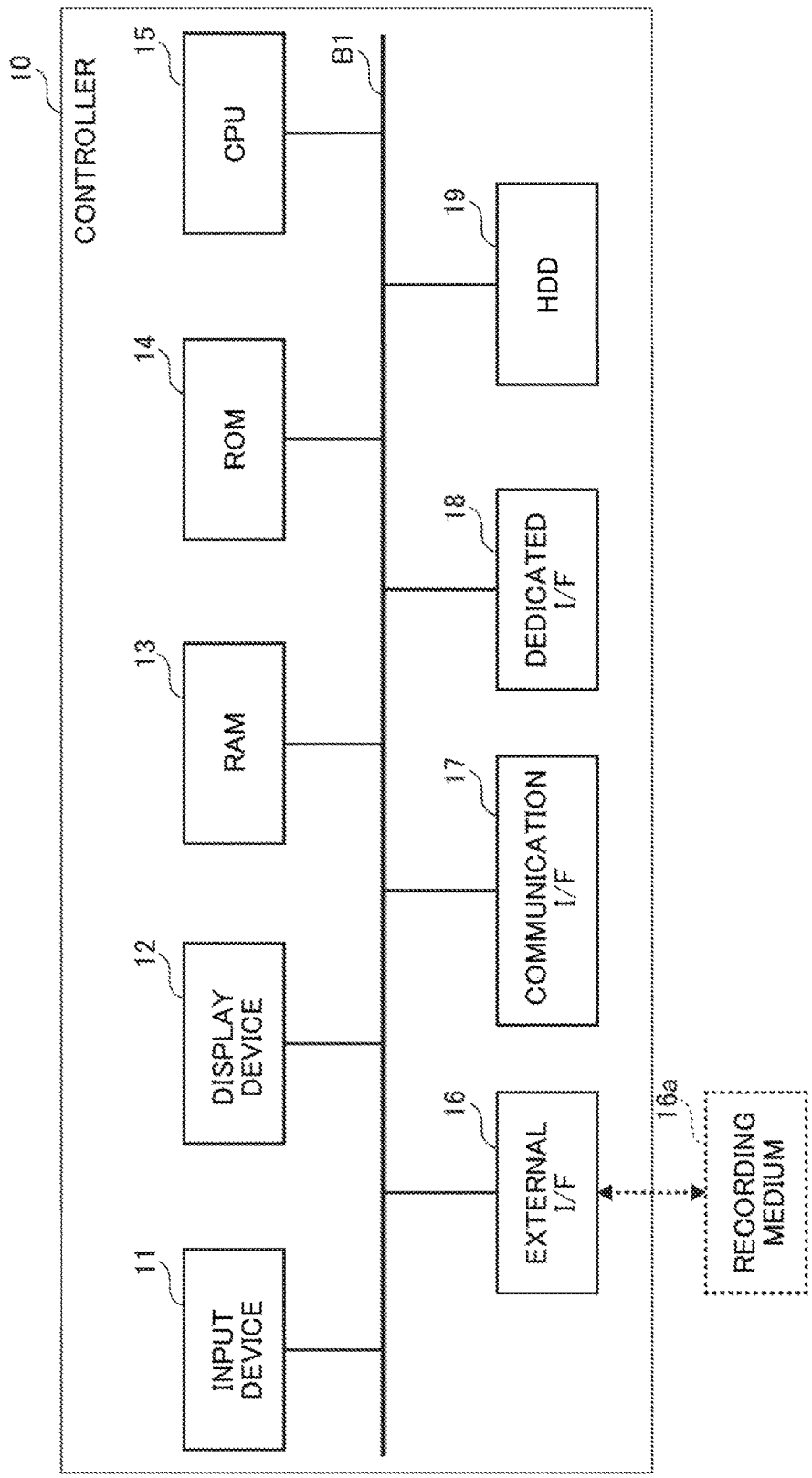
FIG. 2 is a diagram of a hardware configuration of a controller according to the first embodiment.

Next, a hardware configuration of the controller 10 according to the present embodiment is described with reference to FIG. 2. FIG. 2 is a diagram of a hardware configuration of an exemplary controller 10 according to the present embodiment.

As illustrated in FIG. 2, the controller 10 includes an input device 11, a display device 12, a random access memory (RAM) 13, a read only memory (ROM) 14, and a central processing unit (CPU) 15. Also, the controller 10 includes an external interface (I/F) 16, a communication I/F 17, a dedicated I/F 18, and a hard disk drive (HDD) 19. In addition, these hardware is connected to each other via a bus B1.

The input device 11 is any input device allowing a user to input instructions, such as a keyboard, a mouse, and a touch panel. The display device 12 is any type of display, such as a liquid crystal display, which displays various processing results. At least one of the input device 11 and the display device 12 may be an external device, which is connected to the bus B1 through the external I/F 16, for example.

The RAM 13 is a volatile semiconductor memory for temporality storing a program and data. The ROM 14 is a non-volatile semiconductor memory capable of keep storing the data even when a power is turned off. The CPU 15 is, for example, a processor that reads a program and data from the HDD 19 and the ROM 14 onto the RAM 13 and executes various processing.

The external I/F 16 is an interface with an external device. The external device is, for example, a recording medium 16a such as a compact disk (CD), a digital versatile disk (DVD), a SD memory card, and a universal serial bus (USB) memory. The controller 10 reads or writes data from or to the recording medium 16a via the external I/F 16.

The communication I/F 17 is an interface to connect the controller 10 to the network 50. The controller 10 receives a request, such as a print job start request or a print request of the page to be printed, from the terminal device 40 via the communication I/F 17.

The dedicated I/F 18 is an interface to connect the controller 10 to the dedicated line 60. The controller 10 can transmit the print request of the print page and the like to the printer 20 via the dedicated I/F 18.

The HDD 19 is a non-volatile memory for storing programs and data. The programs stored in the HDD 19 include an operating system (OS) which is basic software for controlling the controller 10 and various application programs for operating on the OS.

The controller 10 according to the present embodiment performs various processing to be described below with hardware as illustrated in FIG. 2. Also, the terminal device 40 has a hardware configuration similar to the hardware configuration of the controller 10 except that the terminal device 40 does not include the dedicated I/F 18. For this reasons, description of the hardware configuration of the terminal device 40 is omitted.

Figure 3:
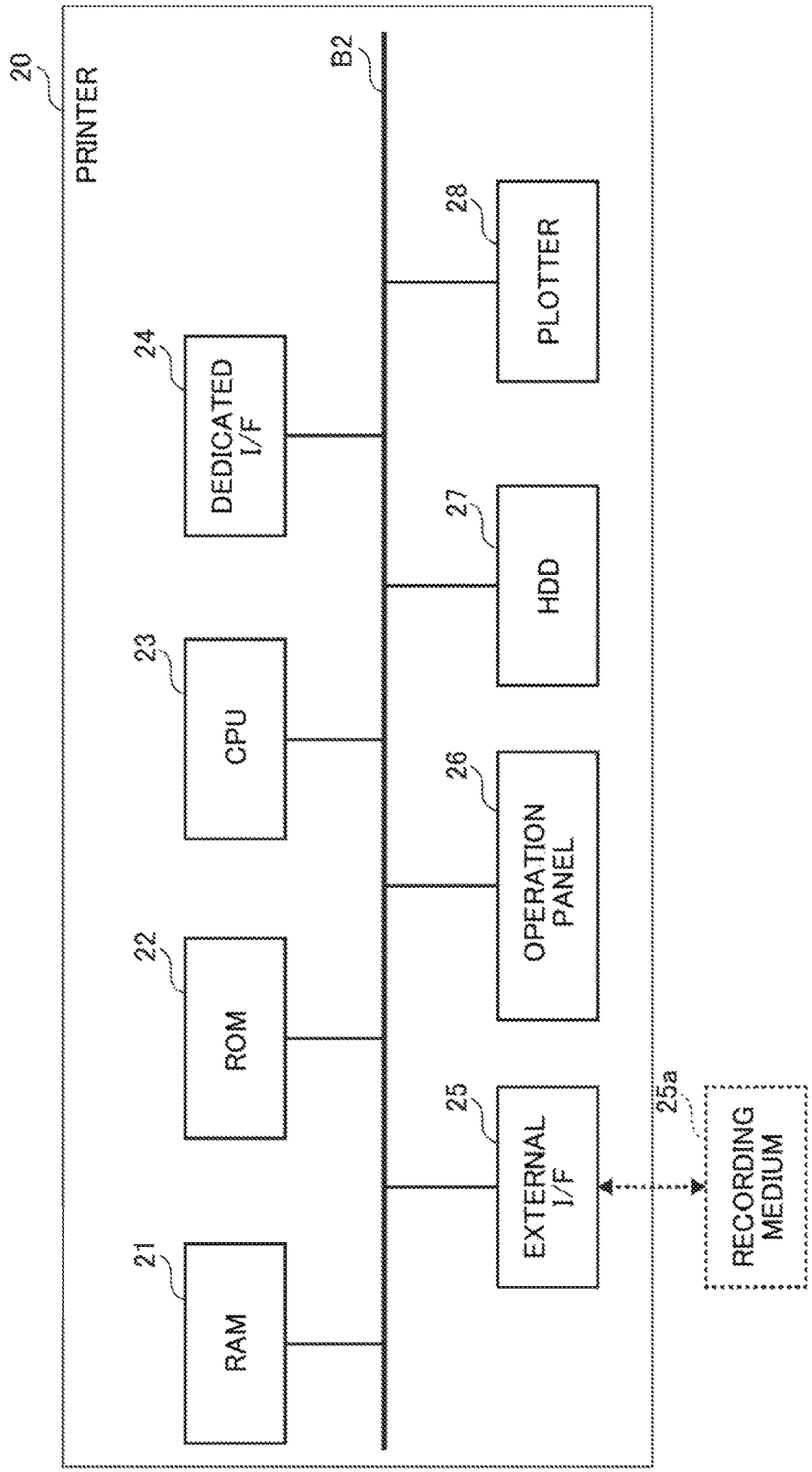
FIG. 3 is a diagram of a hardware configuration of a printer according to the first embodiment.

Next, a hardware configuration of the printer 20 according to the present embodiment is described with reference to FIG. 3. FIG. 3 is a diagram of a hardware configuration of an exemplary printer 20 according to the present embodiment.

As illustrated in FIG. 3, the printer 20 includes a RAM 21, a ROM 22, a CPU 23, a dedicated I/F 24, an external I/F 25, an operation panel 26, an HDD 27, and a plotter 28. These hardware is connected to each other via a bus B2.

The RAM 21 is a volatile semiconductor memory for temporality storing a program and data. The ROM 22 is a non-volatile semiconductor memory capable of storing data even when a power is turned off. The CPU 23 is a processor, which reads a program and data from the HDD 27 and the ROM 22 to the RAM 21 to execute various processing according to the program.

The dedicated I/F 24 is an interface to connect the printer 20 to the dedicated line 60. The printer 20 can receive the print request of the print page and the like from the controller 10 via the dedicated I/F 24.

The external I/F 25 is an interface with an external device. The external device is, for example, a recording medium 25a such as a CD, a DVD, a SD memory card, and a USB memory. The printer 20 writes or reads data to or from the recording medium 25a via the external I/F 25.

The operation panel 26 is an input/output device including a touch panel used to input various operations and a display which displays various processing results.

The HDD 27 is a non-volatile memory for storing programs and data. The programs stored in the HDD 27 include an operating system (OS) which is basic software for controlling the printer 20 and various application programs for operating on the OS.

The plotter 28 includes an image forming unit and forms an output image on a print medium such as a paper sheet. A method for forming an output image is, for example, an electrophotographic system and an inkjet system.

The printer 20 according to the present embodiment performs various processing to be described below by using the hardware illustrated in FIG. 3.

Figure 4:
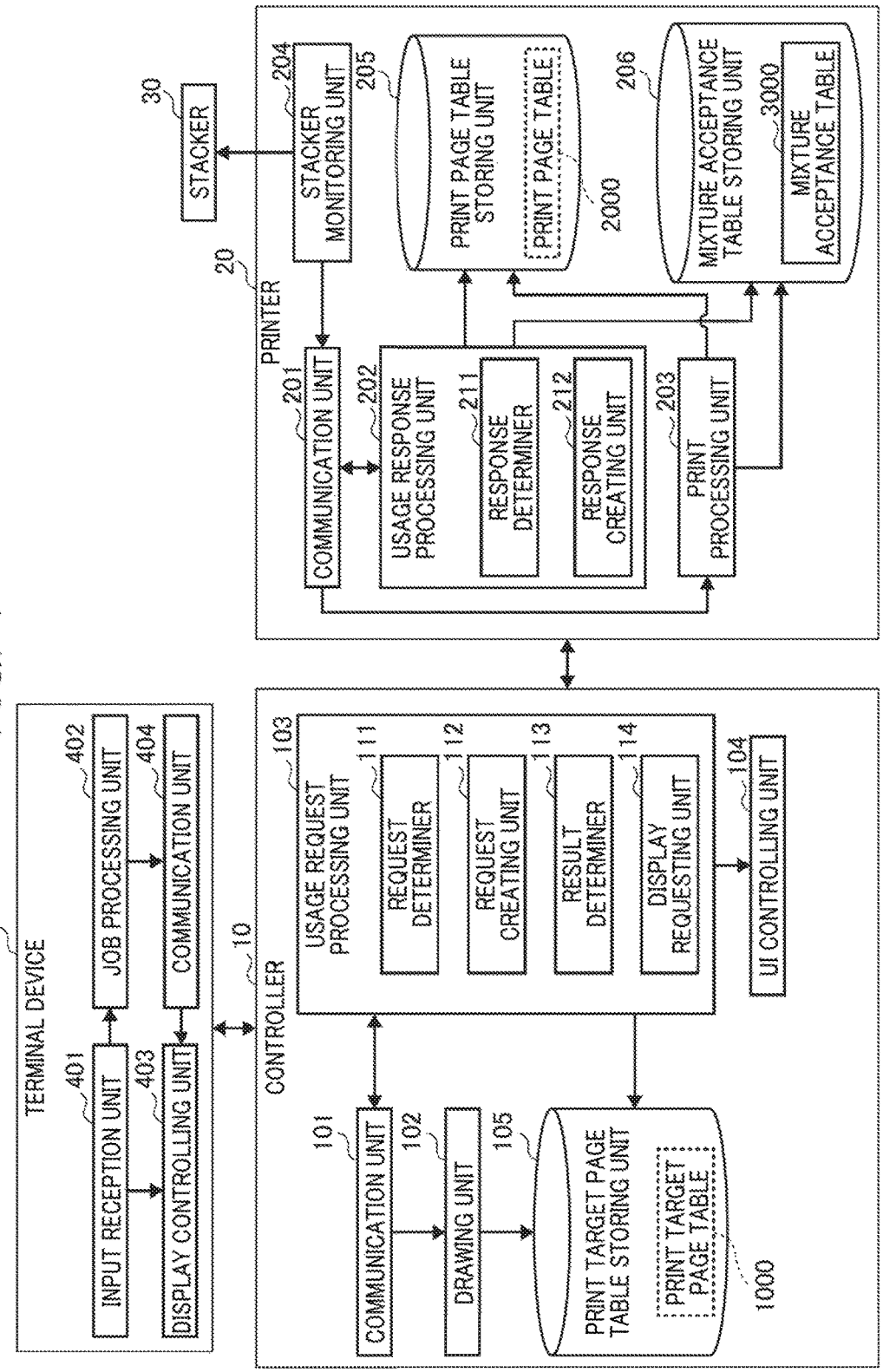
FIG. 4 is a diagram of an exemplary function configuration of the controller, the printer, and a terminal device according to the first embodiment.

Next, the function configuration of the controller 10, the printer 20, and the terminal device 40 according to the present embodiment is described with reference to FIG. 4. FIG. 4 is a diagram of an exemplary function configuration of the controller 10, the printer 20, and the terminal device 40 according to the present embodiment.

As illustrated in FIG. 4, the terminal device 40 according to the present embodiment includes an input reception unit 401, a job processing unit 402, a display controlling unit 403, and a communication unit 404. The functional units are implemented by a plurality of instructions, executed by the CPU 15 according to one or more programs installed on the terminal device 40.

The input reception unit 401 receives inputs of various operations from the user. For example, the input reception unit 401 receives an input of an operation indicating a print instruction regarding the electronic data (print instruction operation).

When the input reception unit 401 has received the print instruction operation, the job processing unit 402 creates a print job to print the electronic data to which the print instruction has been issued (that is, electronic data to be printed). Then, the job processing unit 402 transmits a job start request via the communication unit 404 and transmits a print request of page data included in the electronic data to be printed (that is, page to be printed).

The display controlling unit 403 displays various screens. For example, the display controlling unit 403 displays a warning screen to prevent printed matters having different paper sizes from being mixed on the stacker 30, in response to a request from the controller 10.

The communication unit 404 transmits/receives various data to/from the controller 10. For example, the communication unit 404 transmits the job start request to the controller 10. Also, for example, the communication unit 404 transmits the print request of the page to be printed to the controller 10.

As illustrated in FIG. 4, the controller 10 according to the present embodiment includes a communication unit 101, a drawing unit 102, a usage request processing unit 103, and a user interface (UI) controlling unit 104. The functional units are implemented by a plurality of instructions, executed by the CPU 23 according to one or more programs installed on the controller 10.

Also, the controller 10 according to the present embodiment includes a print target page table storing unit 105. The storing unit 105 can be implemented, for example, by the HDD 19. Alternatively, the storing unit 105 may be implemented, for example, by a storage device connected to the controller 10 via the network 50.

The communication unit 101 transmits/receives various data to/from the terminal device 40 and the printer 20. For example, the communication unit 101 receives the job start request and the print request of a page to be printed from the terminal device 40. Also, for example, the communication unit 101 transmits a request for using a stacker and a print request of the print page to be described below to the printer 20.

When receiving the print request of the page to be printed via the communication unit 101, the drawing unit 102 creates a print page by performing the RIP processing to the page to be printed included in the print request.

Also, the drawing unit 102 creates a print target page table 1000 for each page to be printed included in the print request of the page to be printed received from the terminal device 40 and causes the print target page table storing unit 105 to store the print target page table 1000. The print target page table 1000 stores information on the page to be printed (for example, job ID, page ID, stacker 30 to be paper ejection destination, and paper size).

The usage request processing unit 103 performs processing to transmit the request for using a stacker and processing after receiving a response to the request for using a stacker (stacker usage response). Here, the usage request processing unit 103 includes a request determiner 111, a request creating unit 112, a result determiner 113, and a display requesting unit 114.

The request determiner 111 determines whether to transmit the request for using a stacker to the printer 20. Here, the request determiner 111 refers to the print target page table 1000, to determine whether the stackers 30 serving as the paper ejection destinations are different from each other and whether the paper sizes of the pages to be printed are different from each other. Based on this determination, the request determiner 111 determines whether to transmit the request for using a stacker to the printer 20.

That is, the request determiner 111 determines whether the stackers 30 as the paper ejection destinations of a nth page to be printed and a n−1th page to be printed are different from each other, and whether the paper sizes are different from each other, while assuming that the reference n is an integer equal to or more than two. Based on the above determination, the request determiner 111 determines whether to transmit the request for using a stacker to the printer 20.

In a case where the request determiner 111 has determined to transmit the request for using a stacker to the printer 20, the request creating unit 112 creates the request for using a stacker. Here, the request to use a stacker is a request for using the stacker 30 regarding the request for using a stacker and includes information for identifying the stacker 30 to be the paper ejection destination and the paper size of the printed matter to be ejected on the stacker 30.

The result determiner 113 determines a response result of the stacker usage response. That is, the result determiner 113 determines which one of "suspension" indicating that the usage of the stacker 30 is permitted and "suspension" indicating that the usage of the stacker 30 is not permitted the stacker usage response is.

As described below, when receiving the request for using a stacker, the printer 20 determines whether the stacker 30 to be the paper ejection destination permits the mixture of the paper sizes and transmits the stacker usage response indicating "suspension" or "continuance" according to the determination result.

In a case where the result determiner 113 has determined that the response result of the stacker usage response is "suspension", the display requesting unit 114 transmits a warning screen display request to display a predetermined warning screen on the terminal device 40. With this request, a warning screen to prevent printed matters having different paper sizes from being mixed on the stacker 30 is displayed on the terminal device 40.

The print target page table storing unit 105 stores the print target page table 1000 for each page to be printed. Furthermore, the print target page table 1000 is described in detail below.

The UI controlling unit 104 receives inputs of various operations from the user and displays various screens. For example, in a case where the result determiner 113 of the usage request processing unit 103 has determined that the response result of the stacker usage response is "suspension", the UI controlling unit 104 displays the predetermined warning screen. Accordingly, the warning screen to prevent the printed matters having different sizes from being mixed on the stacker 30 is displayed on the controller 10.

As illustrated in FIG. 4, the printer 20 according to the present embodiment includes a communication unit 201, a usage response processing unit 202, a print processing unit 203, and a stacker monitoring unit 204. The functional units are implemented by the CPU 23 according to one or more programs installed to the printer 20.

Also, the printer 20 according to the present embodiment includes a print page table storing unit 205 and a mixture acceptance table storing unit 206. These storing units can be implemented, for example, by the HDD 27.

The communication unit 201 transmits/receives various data to/from the controller 10. For example, the communication unit 201 receives the request for using a stacker and the print request of the print page from the controller 10. Also, for example, the communication unit 201 transmits the stacker usage response to the controller 10.

The usage response processing unit 202 performs processing to transmit the request for using a stacker. Here, the usage response processing unit 202 includes a response determiner 211 and a response creating unit 212.

The response determiner 211 determines which one of stacker usage responses respectively indicating the response results "continuance" and "suspension" is created. That is, the response determiner 211 determines whether the stackers 30 to be the paper ejection destination are different from each other and whether the stacker 30 to be the paper ejection destination permits the mixture of the paper sizes with reference to a print page table 2000 and a mixture acceptance table 3000 to be described below. Accordingly, the response determiner 211 determines which one of the stacker usage responses respectively indicating the response results "continuance" and "suspension" is created.

The response creating unit 212 creates the stacker usage response indicating one of the response results "continuance" or "suspension" according to the determination result of the response determiner 211

When receiving the print request of the print page via the communication unit 201, the print processing unit 203 prints the print page included in the print request on a print medium to create a printed matter. Then, the print processing unit 203 performs control so that the created printed matter is ejected on the stacker 30 to be the paper ejection destination Also, the print processing unit 203 creates the print page table 2000 for each print page included in the print request of the print page received from the controller 10 and causes the print page table storing unit 205 to store the created table. The print page table 2000 stores information on the print page (for example, job ID, page ID, stacker 30 to be paper ejection destination, and paper size).

The stacker monitoring unit 204 monitors the state of the stacker 30. The stacker monitoring unit 204 monitors the state of the stacker 30, for example, in order to detect that the printed matters stacked on the stacker 30 have been removed.

The print page table storing unit 205 stores the print page table 2000 for each print page. The print page table 2000 is described in detail below.

The mixture acceptance table storing unit 206 stores the mixture acceptance table 3000 which manages whether the stacker 30 permits the mixture of the paper sizes. The mixture acceptance table 3000 is described in detail below.

Figure 5:
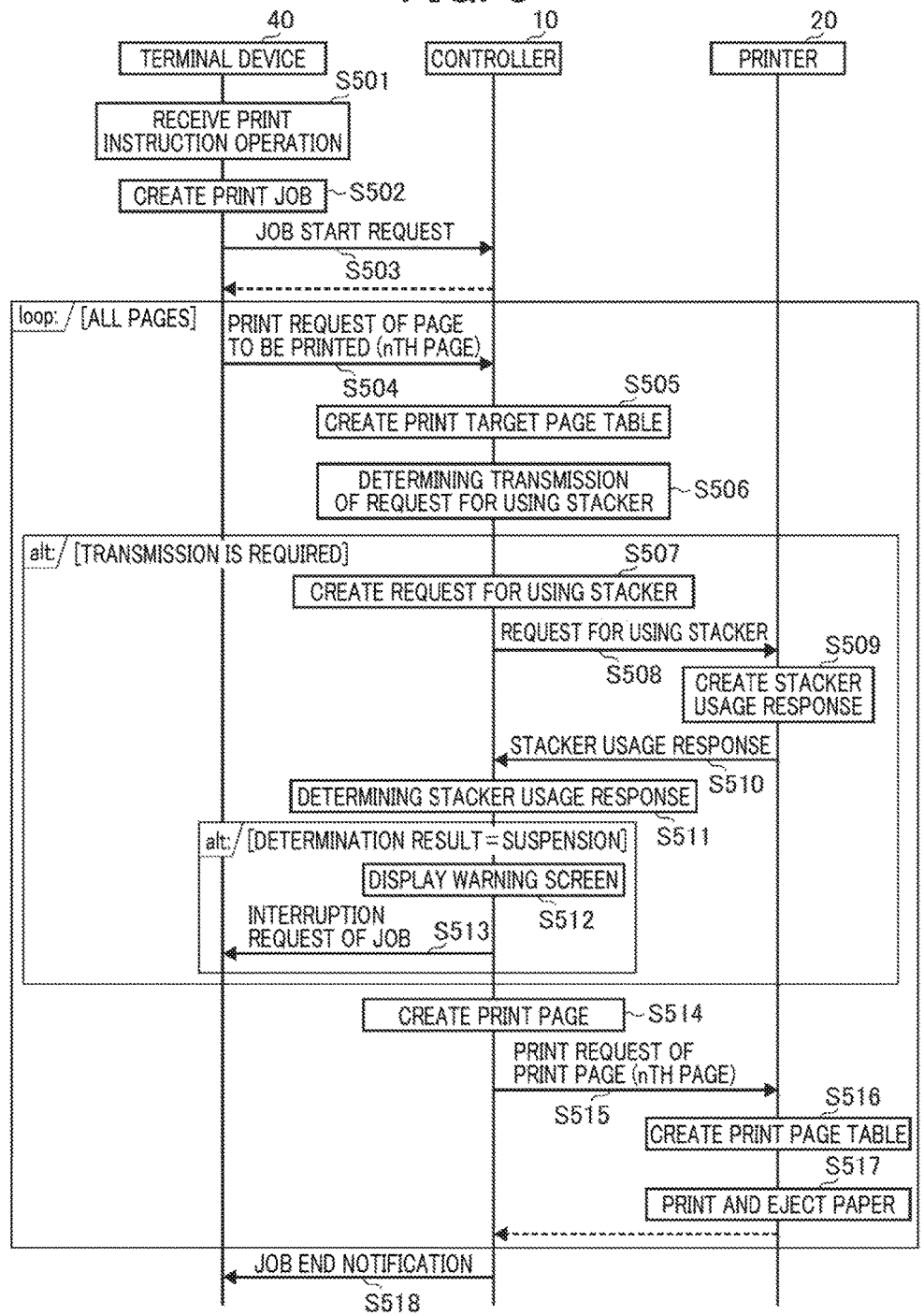
FIG. 5 is a sequence diagram of operation of printing according to an embodiment.

Next, processing of the printing system 1 according to the present embodiment is described in detail. In the following description, processing of printing with the printer 20 according to the print job created by the terminal device 40 is described with reference to FIG. 5. FIG. 5 is a sequence diagram of an example of print processing using the printer 20 according to the present embodiment.

The input reception unit 401 of the terminal device 40 receives an input of a print instruction from the user (step S501). For example, the user instructs to print by selecting a key to start printing after selecting electronic data to be printed using any desired application installed to the terminal device 40.

Next, when the input reception unit 401 has received the print instruction operation, the job processing unit 402 of the terminal device 40 creates a print job to print the electronic data specified by the user (step S502).

Next, the job processing unit 402 of the terminal device 40 transmits the job start request to the controller 10 via the communication unit 404 (step S503). Then, the terminal device 40 receives a response to the job start request from the controller 10 via the communication unit 404.

The terminal device 40 sequentially transmits the print requests of the pages to be printed included in the electronic data specified by the user to the controller 10. That is, for example, in a case where N pages to be printed are included in the electronic data specified by the user, the terminal device 40 sequentially transmits the print requests from the first page to be printed to the Nth page to be printed to the controller 10. In the following description, a case is described below where the terminal device 40 transmits a print request of an nth page to be printed ($1 \leq n \leq N$) to the controller 10.

The job processing unit 402 of the terminal device 40 transmits the print request of the nth page to be printed to the controller 10 via the communication unit 404 (step S504). The print request of the page to be printed includes the nth page to be printed and information on the page to be printed (for example, job ID, page ID, stacker 30 to be paper ejection destination, and paper size).

When receiving the print request of the page to be printed via the communication unit 101, the drawing unit 102 of the controller 10 creates the print target page table 1000 based on the information on the page to be printed included in the print request. Then, the drawing unit 102 causes the print target page table storing unit 105 to store the created print target page table 1000 (step S505).

Here, the print target page table 1000 is described with reference to FIG. 6. FIG. 6 is a diagram of an exemplary print target page table 1000.

As illustrated in FIG. 6, the print target page table 1000 includes data items such as a job ID, a page ID, a paper ejection tray to be used, and a paper size. The job identification (ID) is information identifying the print job created by the terminal device 40. The page ID is information identifying the page to be printed included in the electronic data to be printed (for example, page number). The paper ejection tray to be used is information indicating the stacker 30 to be the paper ejection destination of the printed matter (for example, ID of stacker 30). The paper size is the size of the print medium (for example, A4 and A3).

Furthermore, the print target page table 1000 may include various data items other than the above. That is, the print target page table 1000 may include, for example, a data item indicating whether double-sided printing is performed, a data item indicating whether the print is a test print, and a data item for setting text processing (edge smoothing and the like). Also, the print target page table 1000 may include, for example, a data item indicating whether aggregate print is performed and a data item for setting post processing (binding and punching).

When receiving the print request of the nth page to be printed, the controller 10 according to the present embodiment creates the print target page table 1000 corresponding to the nth page to be printed and causes the print target page table storing unit 105 to store the created table. Accordingly, the print target page table storing unit 105 stores the print target page table 1000 for each page to be printed included in the electronic data to be printed.

Next, the request determiner 111 of the controller 10 determines whether to transmit a request for using a stacker to the printer 20 (step S506).

That is, the request determiner 111 determines whether the stackers 30 to be the paper ejection destination of the nth page to be printed and the n−1th page to be printed are different from each other and whether the paper sizes are different from each other with reference to the print target page table 1000. With the above determination, the request determiner 111 determines whether to transmit the request for using a stacker to the printer 20. The transmission determining processing of the request for using a stacker in this step is described in detail below.

In a case where the request determiner 111 has determined to transmit the request for using a stacker to the printer 20, the request creating unit 112 of the controller 10 creates the request for using a stacker (step S507). Here, the request creating unit 112 creates the request for using a stacker including the paper ejection tray to be used and the paper size in the print target page table 1000 created in step S505.

Next, the request creating unit 112 of the controller 10 transmits the request for using a stacker to the printer 20 via the communication unit 101 (step S508).

As described above, the controller 10 according to the present embodiment determines whether the stackers 30 to be the paper ejection destination of the nth page to be printed and the n−1th page to be printed are different from each other and whether the paper sizes are different from each other. Then, the controller 10 according to the present embodiment transmits the request for using a stacker to the printer 20 according to the determination result in a case where the stackers 30 to be the paper ejection destination are different from each other and in a case where the stackers 30 to be the paper ejection destination are the same and the paper sizes are different from each other.

Next, when receiving the request for using a stacker via the communication unit 201, the response determiner 211 of the printer 20 determines which one of the stacker usage responses respectively indicating the response results "continuance" or "suspension" is created.

That is, the response determiner 211 determines whether the paper ejection tray to be used (stacker 30 to be paper ejection destination) included in the request for using a stacker permits the mixture of the paper sizes and whether the paper ejection tray to be used is different from the stacker 30 to be the paper ejection destination of the n−1th page of the printed matter. Accordingly, the response determiner 211 determines which one of the stacker usage responses respectively indicating the response results "continuance" or "suspension" is created.

Then, the response creating unit 212 of the printer 20 creates the stacker usage response according to the determination result of the response determiner 211 (step S509). The creation processing of the stacker usage response in this step is described below.

Next, the response creating unit 212 of the printer 20 transmits the stacker usage response to the controller 10 via the communication unit 201 (step S510).

Next, when receiving the stacker usage response via the communication unit 101, the result determiner 113 of the controller 10 determines which one of "continuance" and "suspension" the stacker usage response is (step S511).

In a case where it has been determined in step SS 11 that the stacker usage response is "suspension", the UI controlling unit 104 of the controller 10 displays a warning screen to prevent the printed matters having different sizes from being mixed on the stacker 30 (step S512). When displaying the warning screen, the UI controlling unit 104 sets a displaying flag indicating that the warning screen is displayed to "ON".

Next, when displaying the warning screen, the UI controlling unit 104 of the controller 10 transmits an interruption request of the job to the terminal device 40 (step S513). When receiving the interruption request of the job, the job processing unit 402 of the terminal device 40 interrupts the transmission of the print request of the page to be printed. With this interruption, the printing system 1 according to the present embodiment can interrupt printing while the warning screen is displayed on the controller 10.

Figure 7:
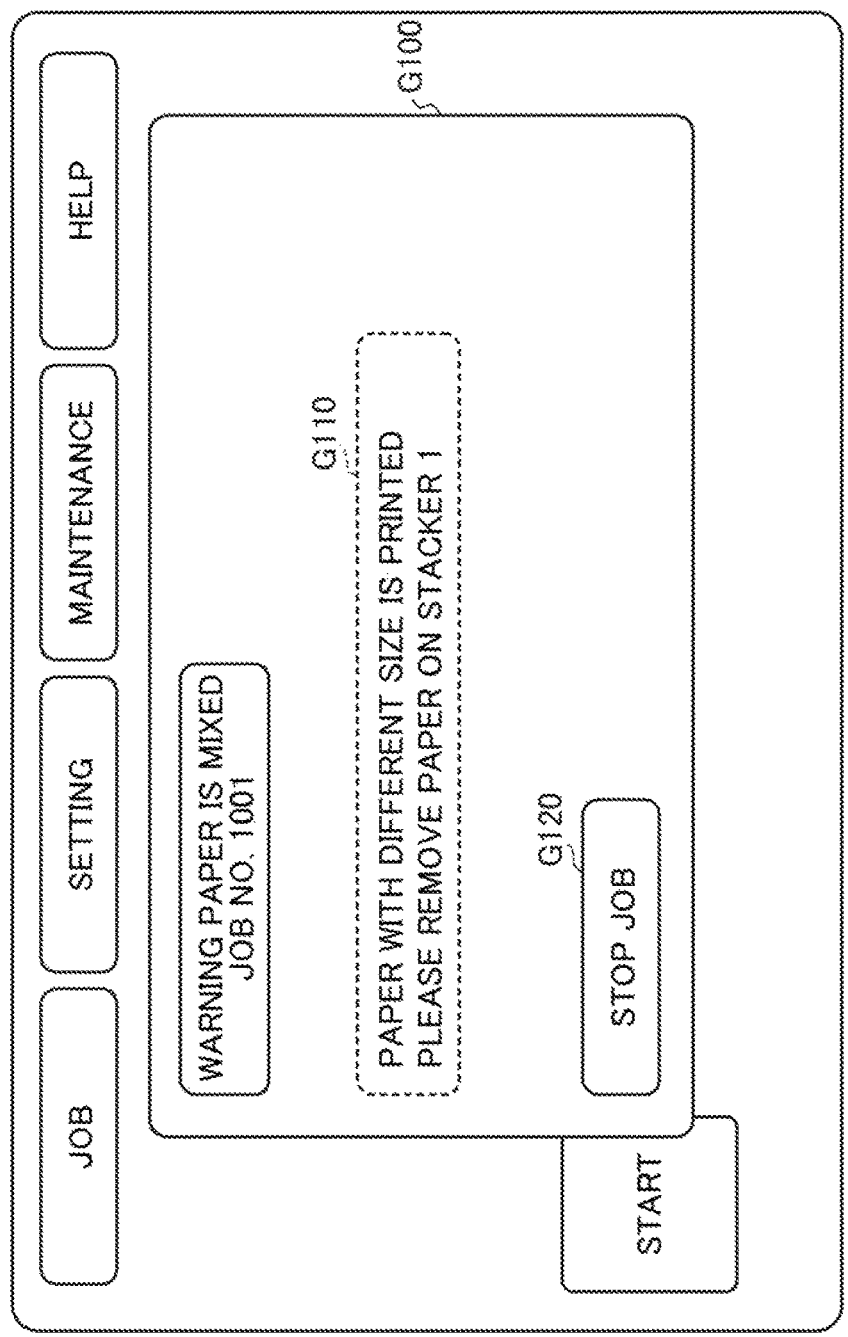
FIG. 7 is a diagram of an exemplary warning screen.

Here, a warning screen G100 displayed by the UI controlling unit 104 is described with reference to FIG. 7. FIG. 7 is a diagram of an exemplary warning screen G100.

As illustrated in FIG. 7, in the warning screen G100, a message GI 10 to warn the user that the printed matters having different paper sizes are mixed on the stacker 30. With this warning, the user can prevent the mixture of the printed matters having different sizes on the stacker 30 by removing the printed matters on the stacker 30.

Furthermore, the warning screen G100 includes a job stop button G120 to stop the print job. The user can stop the print job by pressing the job stop button G120.

Also, the warning screen G100 illustrated in FIG. 7 may be displayed on the terminal device 40 as described below.

Referring back to FIG. 5, in a case where it has been determined in step S511 that the stacker usage response is "continuance", the drawing unit 102 of the controller 10 performs the RIP processing to the data to be printed included in the print request received in step S505 to create a print page (step S514).

Next, the drawing unit 102 of the controller 10 transmits a print request of the print page to the printer 20 via the communication unit 101 (step S515). Here, the print request of the print page includes the print page created in step S515 and information on the print page (for example, job ID, page ID, stacker 30 to be paper ejection destination, and paper size). Also, the information on the print page is, for example, created based on various information included in the print target page table 1000

When receiving the print request of the print page via the communication unit 201, the print processing unit 203 of the printer 20 creates the print page table 2000 based on the information on the print page included in the print request. Then, the print processing unit 203 causes the print page table storing unit 205 to store the created print page table 2000 (step S516).

Figure 8:
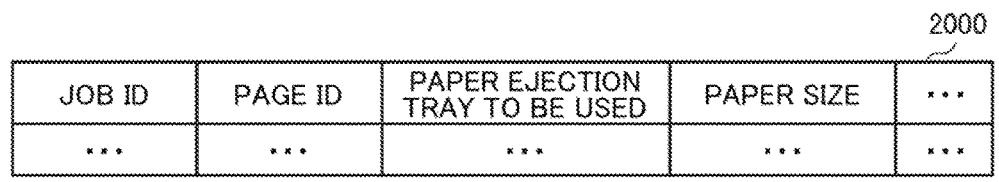
FIG. 8 is a diagram of an exemplary print page table.

Here, the print page table 2000 is described with reference to FIG. 8. FIG. 8 is a diagram of an exemplary print page table 2000.

As illustrated in FIG. 8, the print page table 2000 includes data items such as a job ID, a page ID, a paper ejection tray to be used, and a paper size. The data items are similar to the data items of the print target page table 1000.

The print page table 2000 may include various data items other than the above. That is, the print page table 2000 may include, for example, a data item indicating a paper feeding tray to be used, a data item indicating whether double-sided printing is performed, and a data item indicating the data size of the print data. Also, for example, the print page table 2000 may include the data item indicating the data size of the print data for each of CMYK.

As described above, when receiving the print request of the nth print page, the printer 20 according to the present embodiment creates the print page table 2000 corresponding to the nth print page and causes the print page table storing unit 205 to store the created table. Accordingly, the print page table storing unit 205 stores the print page table 2000 for each page to be printed included in the electronic data to be printed.

Next, the print processing unit 203 of the printer 20 creates a printed matter made by printing the print data on the print medium according to the paper size and the paper ejection tray to be used included in the information on the print data. Then, the print processing unit 203 of the printer 20 outputs the created printed matter on the stacker 30 as the paper ejection destination (step S517).

Accordingly, in the printing system 1 according to the present embodiment, the printed matters are created, and are ejected and stacked on the stacker 30. Also, when the printed matter has been created and ejected, the print processing unit 203 of the printer 20 transmits a notification indicating that the print of the nth page to be printed has been completed to the controller 10.

The printing system 1 according to the present embodiment performs the processing in steps S504 to S517 for each nth page to be printed, that is, each of the first page to the Nth page to be printed (1≤n≤N). Then, when the processing in steps S504 to S517 has been performed to all pages to be printed, the controller 10 transmits a job end notification to the terminal device 40 (step S518).

As described above, the printing system 1 according to the present embodiment can print data to be printed of each page included in the electronic data to be printed. At this time, the printing system 1 according to the present embodiment displays the warning screen in a case where the paper sizes of the nth page and the n−1th page of the printed matters are different from each other and the stacker 30 to be the paper ejection destination does not permit the mixture of the paper sizes.

Accordingly, the user can prevent the printed matters having different sizes from being mixed on the stacker 30 to be the paper ejection destination. That is, the printing system 1 according to one embodiment can assist the prevention of the mixture of the print medium sizes.

Figure 9:
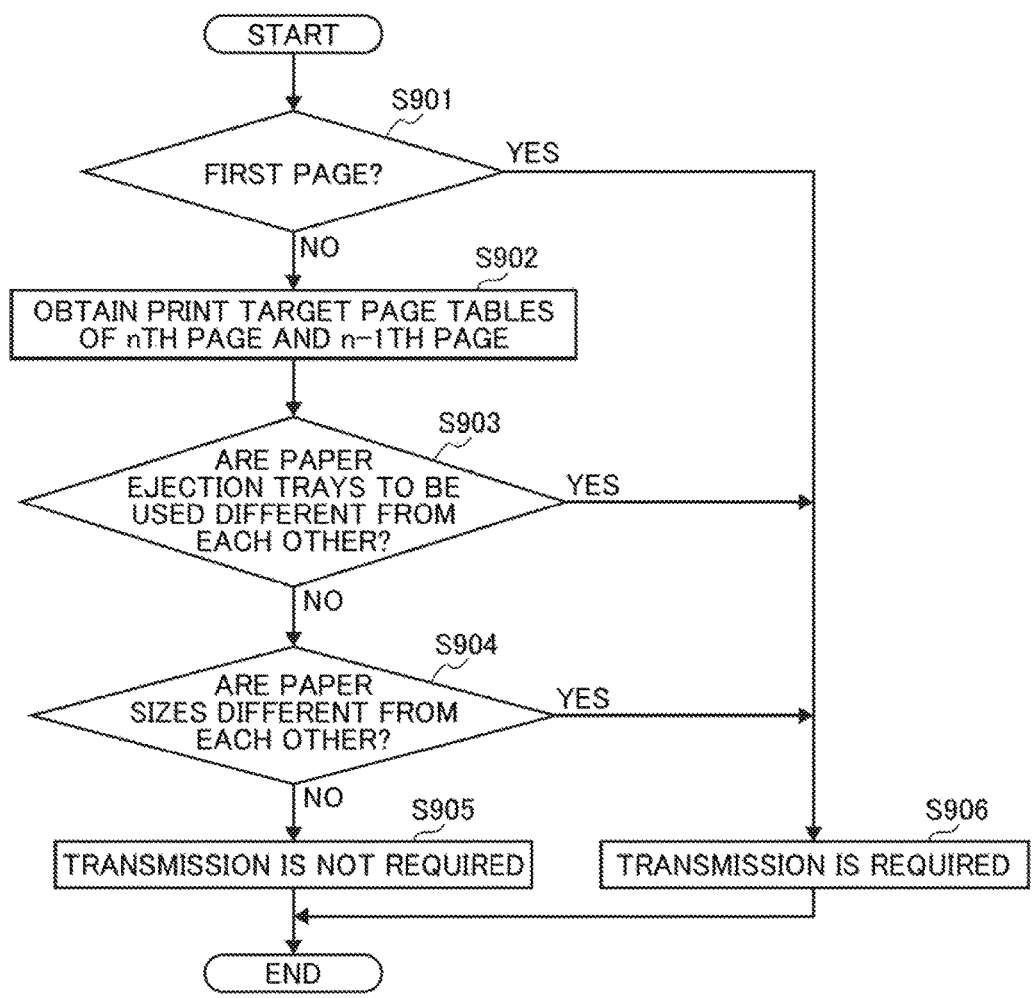
FIG. 9 is a flowchart illustrating operation of determining whether to transmit a request for using a stacker according to an embodiment.

Here, the transmission determining processing of the request for using a stacker in step S506 in FIG. 5 is described with reference to FIG. 9. FIG. 9 is a flowchart of exemplary transmission determining processing of the request for using a stacker according to the present embodiment.

First, the request determiner 111 determines whether the page to be printed is a first page (step S901). That is, the request determiner 111 determines whether the page to be printed is the first page, for example, by referring to the page ID in the print target page table 1000 created in step S505 in FIG. 5

In a case where it has been determined in step S901 that the page to be printed is not the first page, the request determiner 111 obtains print target page tables 1000 of the nth page and the n−1 page from the print target page table storing unit 105 (step S902). That is, the request determiner 111 obtains the print target page table 1000 corresponding to the nth page to be printed and the print target page table 1000 corresponding to the n−1th page to be printed.

Next, the request determiner 111 determines whether the paper ejection trays to be used of the nth page and the n−1th page are different from each other (step S903). That is, the request determiner 111 determines whether the paper ejection tray to be used in the print target page table 1000 of the nth page and the paper ejection tray to be used in the print target page table 1000 of the n−1th page are different from each other.

In a case where it has been determined in step S903 that the paper ejection trays to be used of the nth page and the n−1th page are not different from each other, the request determiner 111 determines whether the paper sizes of the nth page and the n−1th page are different from each other (step S904). That is, the request determiner 111 determines whether the paper size in the print target page table 1000 of the nth page and the paper size in the print target page table 1000 of the n−1th page are different from each other.

In a case where it has been determined in step S904 that the paper sizes of the nth page and the n−1th page are not different, the request determiner 111 determines that the transmission of the request for using a stacker is not required (step S905). In this way, in a case where the paper ejection tray to be used and the paper size of the nth page to be printed are the same as the paper ejection tray to be used and the paper size of the n−1th page to be printed, the request determiner 111 determines that the transmission of the request for using a stacker is not required.

On the other hand, in a case where the page to be printed is the first page, in a case where the paper ejection trays to be used of the nth page and the n−1th page are different from each other, or in a case where the paper sizes of the nth page and the n−1th page are different from each other, the request determiner 111 determines that the transmission of the request for using a stacker is required (step S906). In this way, in a case where the stacker 30 is used for the first time and a case where one of the paper ejection trays to be used and the paper sizes of the nth page to be printed and the n−1th page to be printed are different from each other, the request determiner ill determines that the transmission of the request for using a stacker is required.

As described above, the controller 10 according to the present embodiment determines whether the transmission of the request for using a stacker is required. It is assumed that the controller 10 according to the present embodiment transmits the request for using a stacker to the printer 20 based on the determination result of the transmission determining processing of the request for using a stacker in FIG. 9. However, the destination of the request is not limited to this. For example, the controller 10 may transmit the request for using a stacker to the printer 20 for each page to be printed.

Figure 10:
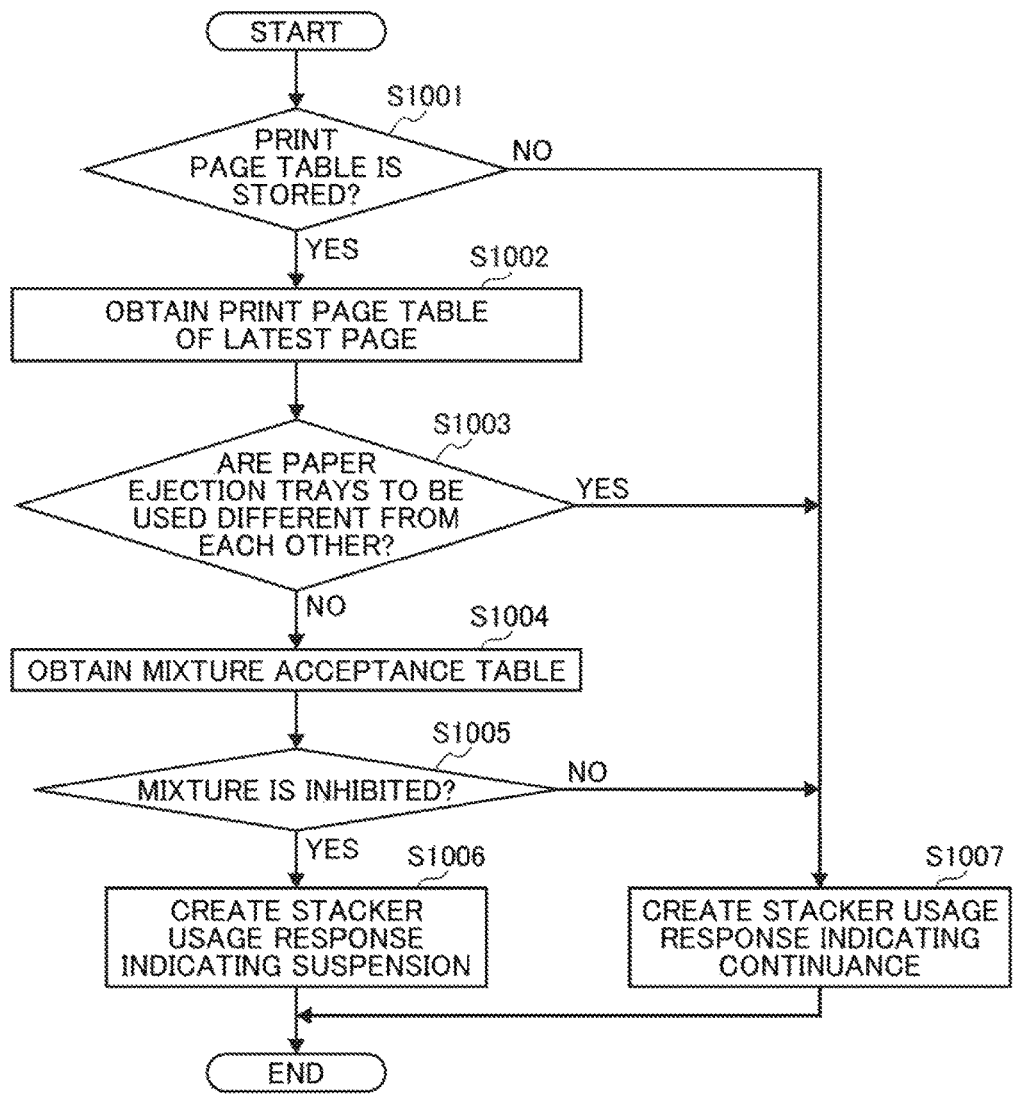
FIG. 10 is a flowchart illustrating operation of creating a stacker usage response according to an embodiment.

Next, the creation processing of the stacker usage response in step S509 in FIG. 5 is described with reference to FIG. 10. FIG. 10 is a flowchart of exemplary processing for creating a stacker usage response according to the present embodiment.

First, the response determiner 211 determines whether at least one print page table 2000 is stored in the print page table storing unit 205 (step S1001). In other words, the response determiner 211 determines whether the page to be printed is the first page.

In a case where it has been determined at step S1001 that the print page table 2000 is stored, the response determiner 211 obtains a print page table 2000 of the latest page from the print page table storing unit 205 (step S1002). That is, the response determiner 211 obtains, for example, the print page table 2000 with the largest page number set to the page ID from the print page table storing unit 205.

Next, the response determiner 211 determines whether the paper ejection tray to be used included in the request for using a stacker received from the controller 10 is different from the paper ejection tray to be used in the print page table 2000 obtained in step S1002 (step S1003).

In a case where it has been determined in step S1003 that the paper ejection trays to be used are different from each other, the response determiner 211 obtains the mixture acceptance table 3000 from the mixture acceptance table storing unit 206 (step S1004).

Here, the mixture acceptance table 3000 is described with reference to FIG. 11. FIG. 11 is a diagram of an exemplary mixture acceptance table 3000 according to the present embodiment.

As illustrated in FIG. 11, the mixture acceptance table 3000 stores paper ejection tray information including information indicating whether the mixture of the paper sizes is permitted ("TRUE" or "FALSE") for each stacker 30.

That is, for example, the mixture acceptance table 3000 stores paper ejection tray information in which a paper ejection tray 1 indicating a stacker 30-1 is associated with TRUE indicating that the mixture of the paper sizes is permitted. Similarly, for example, the mixture acceptance table 3000 stores paper ejection tray information in which a paper ejection tray 2 indicating a stacker 30-2 is associated with FALSE indicating that the mixture of the paper sizes is not permitted.

In this way, the mixture acceptance table 3000 stores the paper ejection tray information, in which the stacker 30 is associated with the information indicating whether the mixture of the paper sizes is permitted, for each stacker 30.

Referring back to FIG. 10, the response determiner 211 determines whether the paper ejection tray to be used included in the request for using a stacker received from the controller 10 (that is, stacker 30 to be paper ejection destination) permits the mixture of the paper sizes with reference to the mixture acceptance table 3000 (step S1005).

In a case where it has been determined in step S1005 that the mixture of the paper sizes is not permitted, the response creating unit 212 creates a stacker usage response of which the response result indicates "suspension" (step S1006). In this way, in a case where the stackers 30 to be the paper ejection destinations of the nth page and the n−1th page are not different from each other and the stacker 30 does not permit the mixture of the paper sizes, the printer 20 according to the present embodiment creates the stacker usage response of which the response result indicates "suspension".

On the other hand, in a case where the page to be printed is the first page, in a case where the stackers 30 to be the paper ejection destinations are different from each other, or in a case where the stacker 30 to be the paper ejection destination permits the mixture of the paper sizes, the response creating unit 212 creates a stacker usage response of which the response result indicates "continuance" (step S1007). In this way, in a case where the stackers 30 to be the paper ejection destinations of the nth page and the n−1th page are different from each other and in a case where the stacker 30 to be the paper ejection destination permits the mixture of the paper sizes, the printer 20 according to the present embodiment creates the stacker usage response of which the response result indicates "continuance".

As described above, when receiving the request for using a stacker, the printer 20 according to the present embodiment determines whether the stackers 30 to be the paper ejection destinations are different from each other and whether the stacker 30 to be the paper ejection destination permits the mixture of the paper sizes. Accordingly, the printer 20 according to the present embodiment can transmit the stacker usage response according to the determination result to the controller 10.

Figure 12:
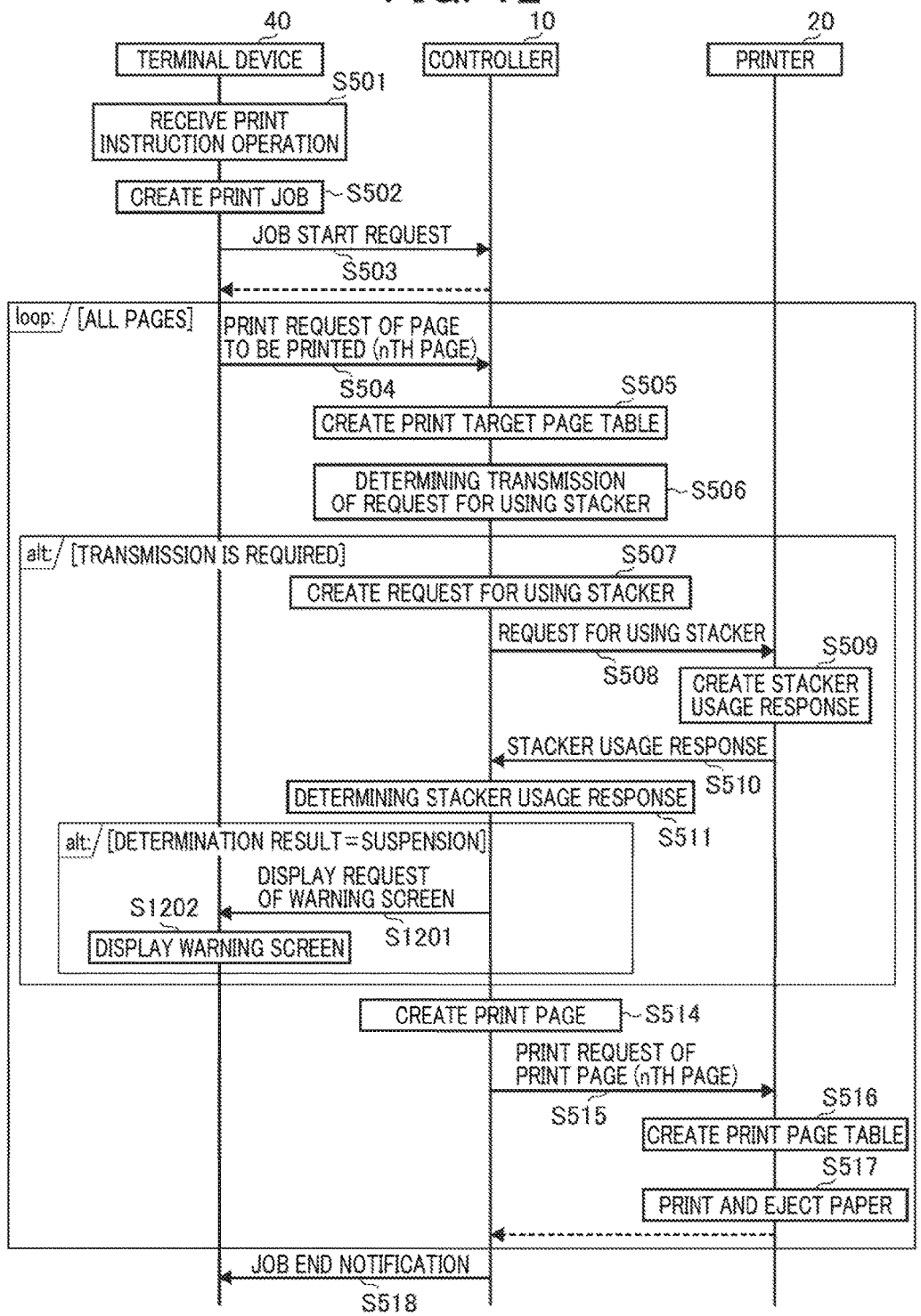
FIG. 12 is a sequence diagram illustrating operation of printing according to an embodiment.

Here, processing in a case where the warning screen to prevent the mixture of the printed matters having different sizes on the stacker 30 is displayed on the terminal device 40 is described with reference to FIG. 12. FIG. 12 is a sequence diagram of another example of printing with the printer 20 according to the present embodiment. Since the processing in steps S501 to S511 and S514 to S518 in FIG. 12 is similar to FIG. 5, the description of this processing is omitted.

In a case where it has been determined in step S511 that the stacker usage response is "suspension", the display requesting unit 114 of the controller 10 transmits the warning screen display request to the terminal device 40 via the communication unit 101 (step S1201). After transmitting the warning screen display request to the terminal device 40, the display requesting unit 114 sets the displaying flag indicating that the warning screen is displayed on the terminal device 40 to "ON".

When receiving the warning screen display request via the communication unit 404, the display controlling unit 403 of the terminal device 40 displays the warning screen to prevent the mixture of the printed matters having different paper sizes on the stacker 30 (step S1202). At this time, the job processing unit 402 of the terminal device 40 interrupts the transmission of the print request of the page to be printed while the warning screen is displayed. Accordingly, the printing system 1 according to the present embodiment can interrupt the printing while the warning screen is displayed on the terminal device 40.

As described above, in a case where the paper sizes of the printed matters of the nth page and the n−1th page are different from each other and the stacker 30 to be the paper ejection destination does not permit the mixture of the paper sizes, the printing system 1 according to the present embodiment may display a predetermined warning screen on the terminal device 40.

Figure 13:
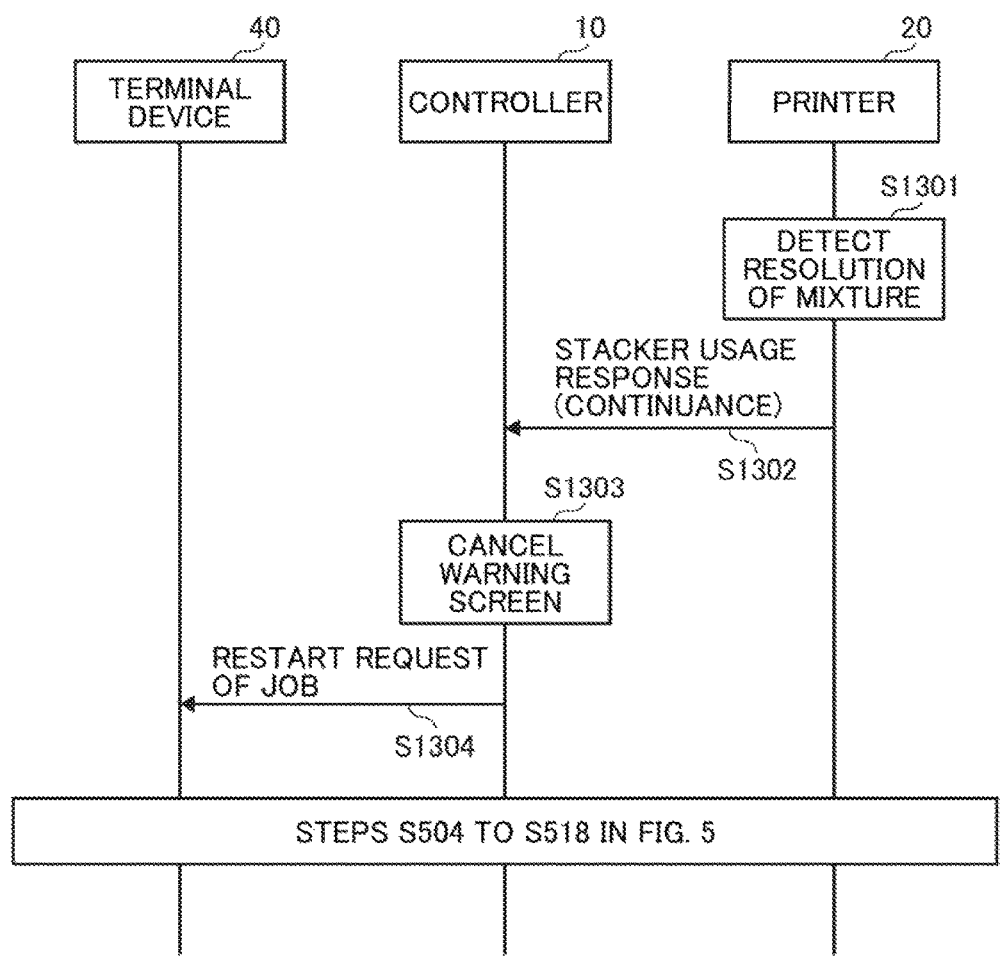
FIG. 13 is a sequence diagram of exemplary processing after a printed matter is removed from the stacker where paper is ejected in a case where the warning screen is displayed.

Here, processing in a case where the printed matter is removed from the stacker 30 when the warning screen G100 illustrated in FIG. 7 is displayed on the controller 10 as a result of the processing in step S512 in FIG. 5 is described with reference to FIG. 13. FIG. 13 is a sequence diagram of exemplary processing after a printed matter is removed from the stacker 30 to be the paper ejection destination in a case where the warning screen G100 is displayed.

For example, when the user removes the printed matters stacked on the stacker 30 to be the paper ejection destination, the stacker monitoring unit 204 detects that the printed matters stacked on the stacker 30 have been removed (step S1301).

Next, when detecting that the printed matters stacked on the stacker 30 to be the paper ejection destination have been removed, the stacker monitoring unit 204 creates a stacker usage response of which the response result indicates "continuance". Then, the stacker monitoring unit 204 transmits the created stacker usage response to the controller 10 via the communication unit 201 (step S1302).

When receiving the stacker usage response of which the response result indicates "continuance" via the communication unit 101, the UI controlling unit 104 of the controller 10 cancels the display of the warning screen G100 illustrated in FIG. 7 (step S1303). Furthermore, the UI controlling unit 104 set the displaying flag to "OFF" after cancelling the display of the warning screen.

Next, when cancelling the display of the warning screen, the UI controlling unit 104 of the controller 10 transmits a restart request of the job to the terminal device 40 (step S1304). When the job processing unit 402 of the terminal device 40 receives the restart request of the job, the processing in step S504 is performed. Accordingly, the terminal device 40 can transmit the next page to be printed.

In this way, the terminal device 40 according to the present embodiment can temporarily interrupt the print job by preventing the transmission of the page to be printed while the warning screen is displayed on the controller 10.

Figure 14:
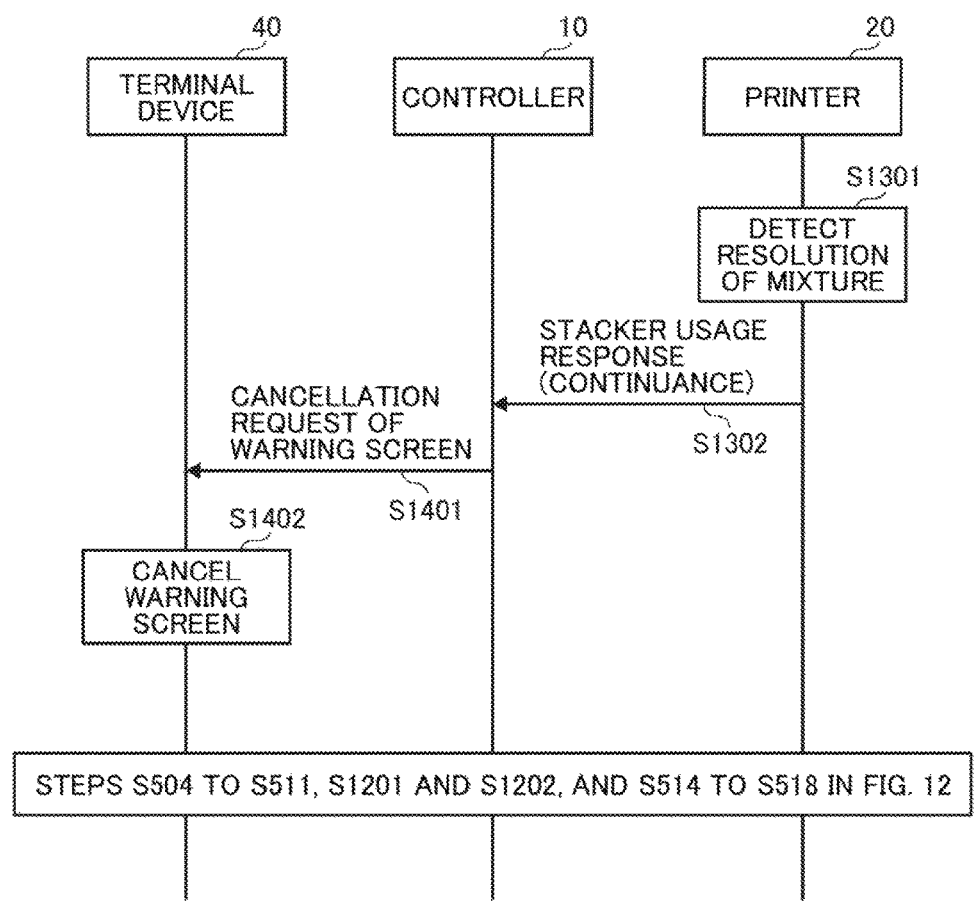
FIG. 14 is a sequence diagram of another exemplary processing after the printed matter is removed from the stacker where the paper is ejected in a case where the warning screen is displayed.

Here, processing in a case where the printed matter is removed from the stacker 30 when the warning screen G100 illustrated in FIG. 7 is displayed on the terminal device 40 as a result of the processing in step S1202 in FIG. 12 is described with reference to FIG. 14. FIG. 14 is a sequence diagram of another exemplary processing after the printed matter is removed from the stacker 30 to be the paper ejection destination in a case where the warning screen G100 is displayed. Since the processing in steps S1301 and S1302 in FIG. 14 is similar to FIG. 13, the description of the processing is omitted.

Subsequently to step S1302, when receiving the stacker usage response of which the response result indicates "continuance" via the communication unit 101, the display requesting unit 114 of the controller 10 transmits a cancel request of the warning screen to the terminal device 40 (step S1401). Also, when receiving the stacker usage response of which the response result indicates "continuance", it is preferable that the display requesting unit 114 transmit the cancel request of the warning screen to the terminal device 40 when the displaying flag is "ON". When transmitting the cancel request of the warning screen to the terminal device 40, the display requesting unit 114 sets the displaying flag to "OFF".

When receiving the cancel request of the warning screen, the display controlling unit 403 of the terminal device 40 cancels the display of the warning screen G100 illustrated in FIG. 7 (step S1402). With this cancellation, the processing in step S504 is performed, and the terminal device 40 can transmit the next page to be printed.

In this way, the terminal device 40 according to the present embodiment can temporarily interrupt the print job by preventing the transmission of the page to be printed while the warning screen is displayed.

As described above, the printing system 1 according to the present embodiment temporarily interrupts the print job while the warning screen is displayed on the controller 10 or the terminal device 40. This can prevent a state in which the printed matters having different paper sizes are mixed on the stacker 30 (which does not permit the mixture of the paper sizes).

Next, a second embodiment is described. In the first embodiment, an example has been described in which the print job is temporarily interrupted in a case where the paper sizes are different from each other and the stacker 30 which does not permit the mixture of the paper sizes is the paper ejection destination. However, for example, in a printing work in which the paper sizes are often switched, a work to remove the paper in the stacker 30 is often required, and an efficiency of the printing work may be deteriorated.

Therefore, in the second embodiment, a case is described where the print job is not interrupted in a case where a difference between the paper size of the page and the paper size of the previous page is within a predetermined reference value even when the paper sizes are different from each other.

In the second embodiment, a difference with the first embodiment is mainly described. Description of each part including a function configuration substantially similar to the function configuration of the first embodiment and each part for performing processing substantially similar to the first embodiment is appropriately omitted.

Figure 15:
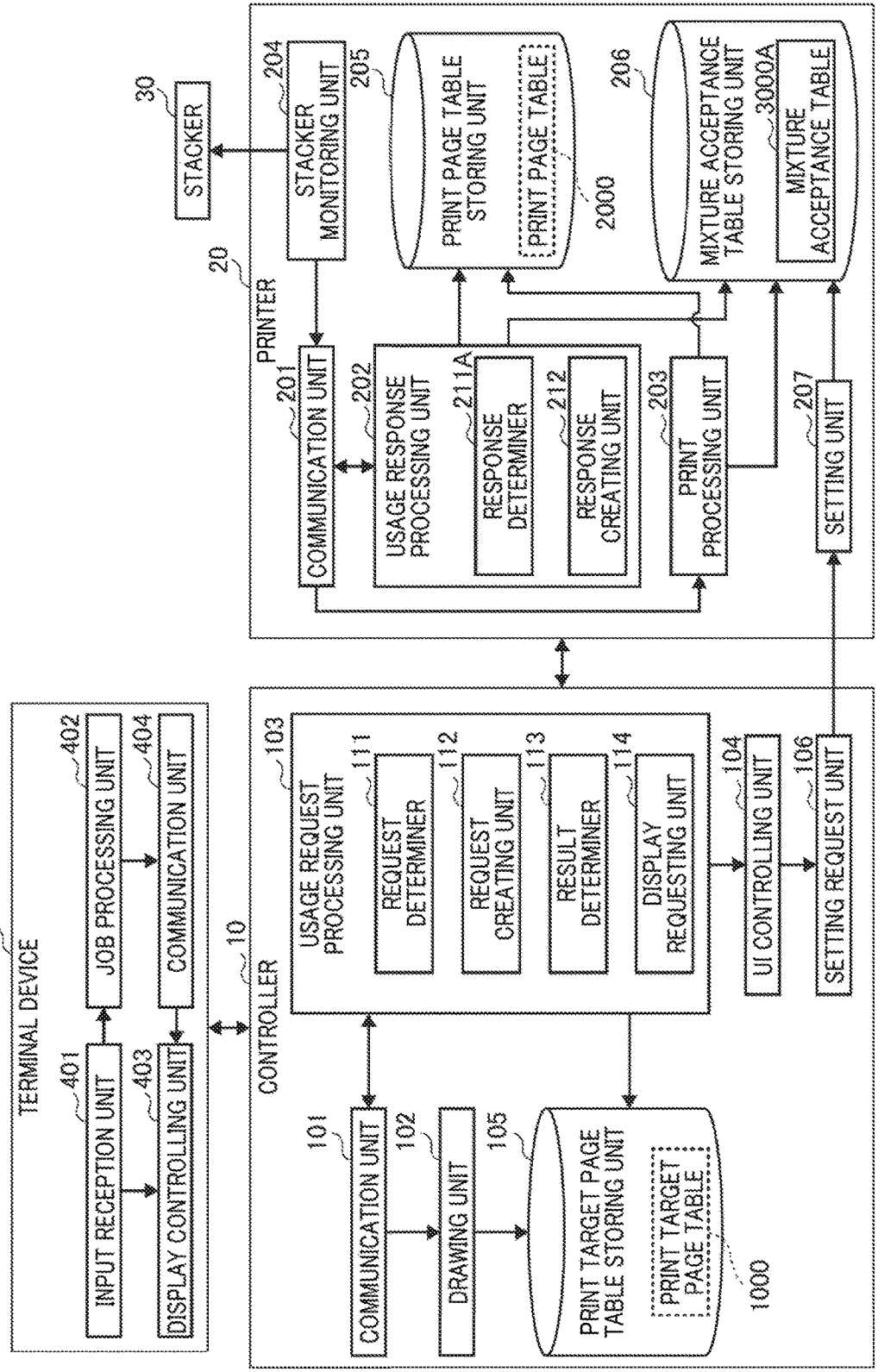
FIG. 15 is a diagram of an exemplary function configuration of a controller, a printer, and a terminal device according to a second embodiment.

First, a function configuration of a controller 10, a printer 20, and a terminal device 40 according to the present embodiment is described with reference to FIG. 15. FIG. 15 is a diagram of an exemplary function configuration of the controller 10, the printer 20, and the terminal device 40 according to the present embodiment.

As illustrated in FIG. 15, a usage response processing unit 202 of the printer 20 according to the present embodiment includes a response determiner 211A. The response determiner 211A further determines whether a difference between the paper size of the page with the paper size of the previous page is within a predetermined reference value with reference to a print page table 2000 and a mixture acceptance table 3000A to be described.

Also, the printer 20 according to the present embodiment further includes a setting unit 207. The setting unit 207 updates paper ejection tray information stored in the mixture acceptance table 3000A stored in the mixture acceptance table storing unit 206 in response to a request from the controller 10. Here, the paper ejection tray information stored in the mixture acceptance table 3000A according to the present embodiment includes information indicating a reference value of a paper width and information indicating a reference value of a paper length. In the following description, the reference value of the paper width and the reference value of the paper length are collectively referred to as a "reference value".

As illustrated in FIG. 15, the controller 10 according to the present embodiment further includes a setting request unit 106. For example, the setting request unit 106 transmits a setting request to set the reference value of the paper width and the reference value of the paper length to the printer 20.

Figure 16:
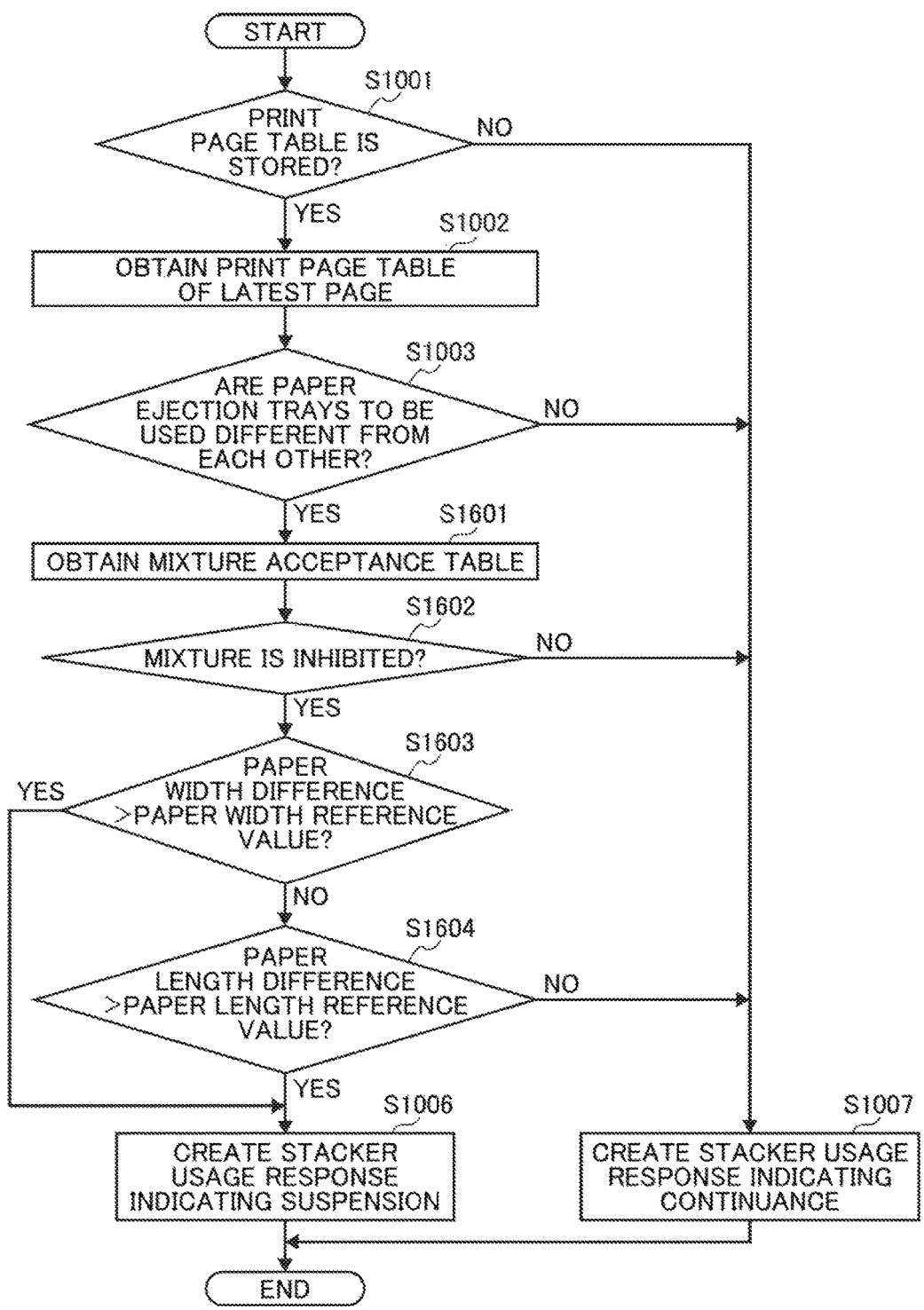
FIG. 16 is a flowchart illustrating operation of creating a stacker usage response according to the second embodiment.

Next, processing of a printing system 1 according to the present embodiment is described in detail. In the present embodiment, step S507 in FIGS. 5 and 12 (creation processing of stacker usage response) is different from the first embodiment. Therefore, the creation processing of the stacker usage response according to the present embodiment is described with reference to FIG. 16. FIG. 16 is a flowchart of exemplary creation processing of the stacker usage response according to the present embodiment. Since processing in steps S1001 to S1003 and steps S1006 and S1007 in FIG. 16 is similar to the processing in FIG. 10, the description on the processing is omitted.

In a case where it has been determined in step S1003 that the paper ejection trays to be used are different from each other, the response determiner 211A obtains the mixture acceptance table 3000A from the mixture acceptance table storing unit 206 (step S1601).

Here, the mixture acceptance table 3000A is described with reference to FIG. 17. FIG. 17 is a diagram of an exemplary mixture acceptance table 3000A according to the present embodiment.

As illustrated in FIG. 17, the mixture acceptance table 3000A stores paper ejection tray information including information indicating whether the mixture of the paper sizes is permitted ("TRUE" or "FALSE"), information indicating a reference value of a paper width, and information indicating a reference value of a paper length for each stacker 30.

That is, the mixture acceptance table 3000A, for example, stores paper ejection tray information in which a paper ejection tray 1 indicating a stacker 30-1, TRUE indicating that the mixture of the paper sizes is permitted, a reference value "x1" of the paper width, and a reference value "y1" of the paper length are associated with each other. Similarly, the mixture acceptance table 3000A, for example, stores paper ejection tray information in which a paper ejection tray 2 indicating a stacker 30-2, FALSE indicating that the mixture of the paper sizes is not permitted, a reference value "x2" of the paper width, and a reference value "y2" of the paper length are associated with each other.

In this way, the mixture acceptance table 3000A stores paper ejection tray information in which the information indicating whether the stacker 30 permits the mixture of the paper sizes, the information indicating the reference value of the paper width, and the information indicating the reference value of the paper length are associated with each other, for each stacker 30.

Referring back to FIG. 16, the response determiner 211A determines whether the paper ejection tray to be used included in the request for using a stacker received from the controller 10 permits the mixture of the paper sizes with reference to the mixture acceptance table 3000A (step S1602).

In a case where it has been determined in step S1602 that the mixture of the paper sizes is permitted, the response determiner 211A proceeds the processing to step S1007. In this case, the stacker usage response indicating "continuance" is created.

On the other hand, in a case where it has been determined in step S1602 that the mixture of the paper sizes is not permitted, the response determiner 211A determines whether the paper width difference is larger than a paper width reference value of the paper ejection tray to be used included in the request for using a stacker with reference to the mixture acceptance table 3000A (step S1603). Here, the paper width difference is a difference between the width of the paper size included in the request for using a stacker and the width of the paper size included in the print page table 2000 obtained in step S1002.

In a case where it has been determined in step S1603 that the paper width difference is larger than the paper width reference value, the response determiner 211A proceeds the processing to step S1006. In this case, the stacker usage response indicating "suspension" is created.

On the other hand, in a case where it has been determined in step S1603 that the paper width difference is equal to or less than the paper width reference value, the response determiner 211A determines whether a paper length difference is larger than the paper length reference value of the paper ejection tray to be used included in the request for using a stacker with reference to the mixture acceptance table 3000A (step S1604). Here, the paper length difference is a difference between the length of the paper size included in the request for using a stacker and the length of the paper size included in the print page table 2000 obtained in step S1002.

In a case where it has been determined in step S1604 that the paper length difference is larger than the paper length reference value, the response determiner 211A proceeds the processing to step S1006. In this case, the stacker usage response indicating "suspension" is created.

On the other hand, in a case where it has been determined in step S1602 that the paper length difference is equal to or less than the paper length reference value, the response determiner 211A proceeds the processing to step S1007. In this case, the stacker usage response indicating "continuance" is created.

As described above, when receiving the request for using a stacker, the printer 20 according to the present embodiment further determines whether the difference with the paper size of the previous page is within the predetermined reference value. Accordingly, the printer 20 according to the present embodiment can transmit the stacker usage response indicating "continuance" to the controller 10 in a case where the difference with the paper size of the previous page is within the predetermined reference value even when the paper sizes are different from each other.

Figure 18:
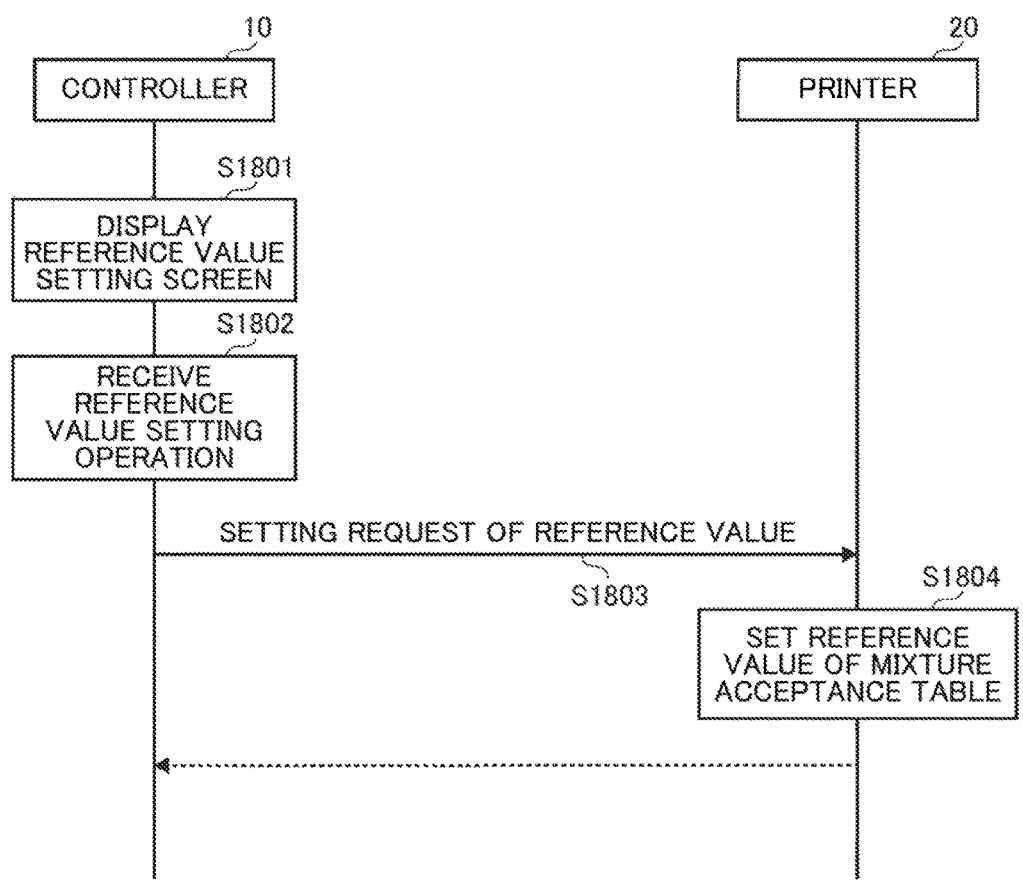
FIG. 18 is a sequence diagram of exemplary setting processing of a reference value.

Next, processing for setting the reference value of the paper ejection tray information stored in the mixture acceptance table 3000A is described with reference to FIG. 18. FIG. 18 is a sequence diagram of exemplary setting processing of the reference value.

First, an UI controlling unit 104 of the controller 10 displays a reference value setting screen to set the reference value (step S1801). For example, in a case where the user performs a display operation to display the reference value setting screen, it is preferable that the UI controlling unit 104 display the reference value setting screen.

Figure 19:
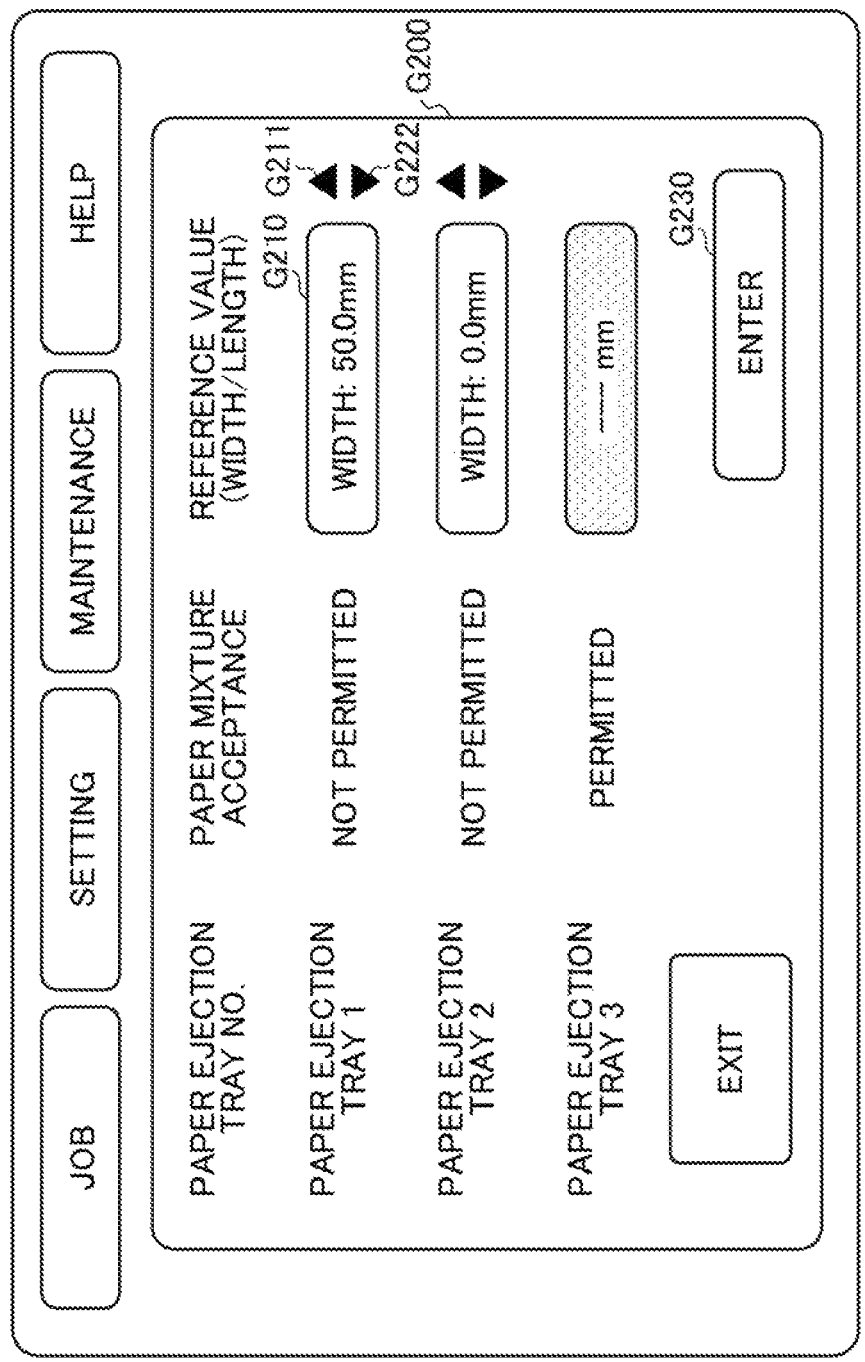
FIG. 19 is a diagram of an exemplary reference value setting screen.

Here, a reference value setting screen G200 displayed by the UI controlling unit 104 is described with reference to FIG. 19. FIG. 19 is a diagram of an exemplary reference value setting screen G200.

As illustrated in FIG. 19, in the reference value setting screen G200, a reference value setting button G210 is associated with reference value changing buttons G221 and G222 for each paper ejection tray. Each time when the user presses the reference value setting button G210, the user can switch the setting of the paper width reference value and the setting of the paper length reference value. Then, the user can change the paper width reference value or the paper length reference value by pressing the reference value changing button G221 or G222.

Each time when the reference value changing button G221 is pressed, the paper width reference value or the paper length reference value increases by a predetermined value. On the other hand, each time when the reference value changing button G222 is pressed, the paper width reference value or the paper length reference value decreases by a predetermined value.

Also, the reference value setting screen G200 includes an ENTER button G230. The user can perform a reference value setting operation to reflect the setting of the reference value by pressing the ENTER button G230. In addition to the reference value, in the reference value setting screen G200, whether the mixture of the paper is permitted can be set for each paper ejection tray.

Next, the UI controlling unit 104 of the controller 10 receives the reference value setting operation by the user (step S1802).

When the UI controlling unit 104 receives the reference value setting operation, the setting request unit 106 of the controller 10 transmits a setting request of the reference value to the printer 20 (step S1803). The setting request of the reference value includes a paper ejection tray number to specify a paper ejection tray and a reference value (paper width reference value and paper length reference value) relative to the paper ejection tray.

When the communication unit 201 receives the setting request of the reference value, the setting unit 207 of the printer 20 updates the paper ejection tray information stored in the mixture acceptance table 3000A (step S1804). That is, the setting unit 207 updates the reference value of the paper ejection tray information corresponding to the paper ejection tray number included in the setting request to the reference value included in the setting request.

As described above, in the printing system 1 according to the present embodiment, the reference value (paper width reference value and paper length reference value) of each paper ejection tray is updated to the value set by the user.

Next, a third embodiment is described. In the first embodiment and the second embodiment, a case has been described where the printer 20 determines whether the paper sizes are different from each other, whether the stacker 30 to be the paper ejection destination permits the mixture of the paper sizes, and whether the difference with the paper size of the previous page is within the reference value. In the third embodiment, a case is described where the above determinations are made by the controller 10.

In the third embodiment, a difference with the second embodiment is mainly described. Description of each part including a function configuration substantially similar to the function configuration of the second embodiment and each part for performing processing substantially similar to the second embodiment is appropriately omitted.

Figure 20:
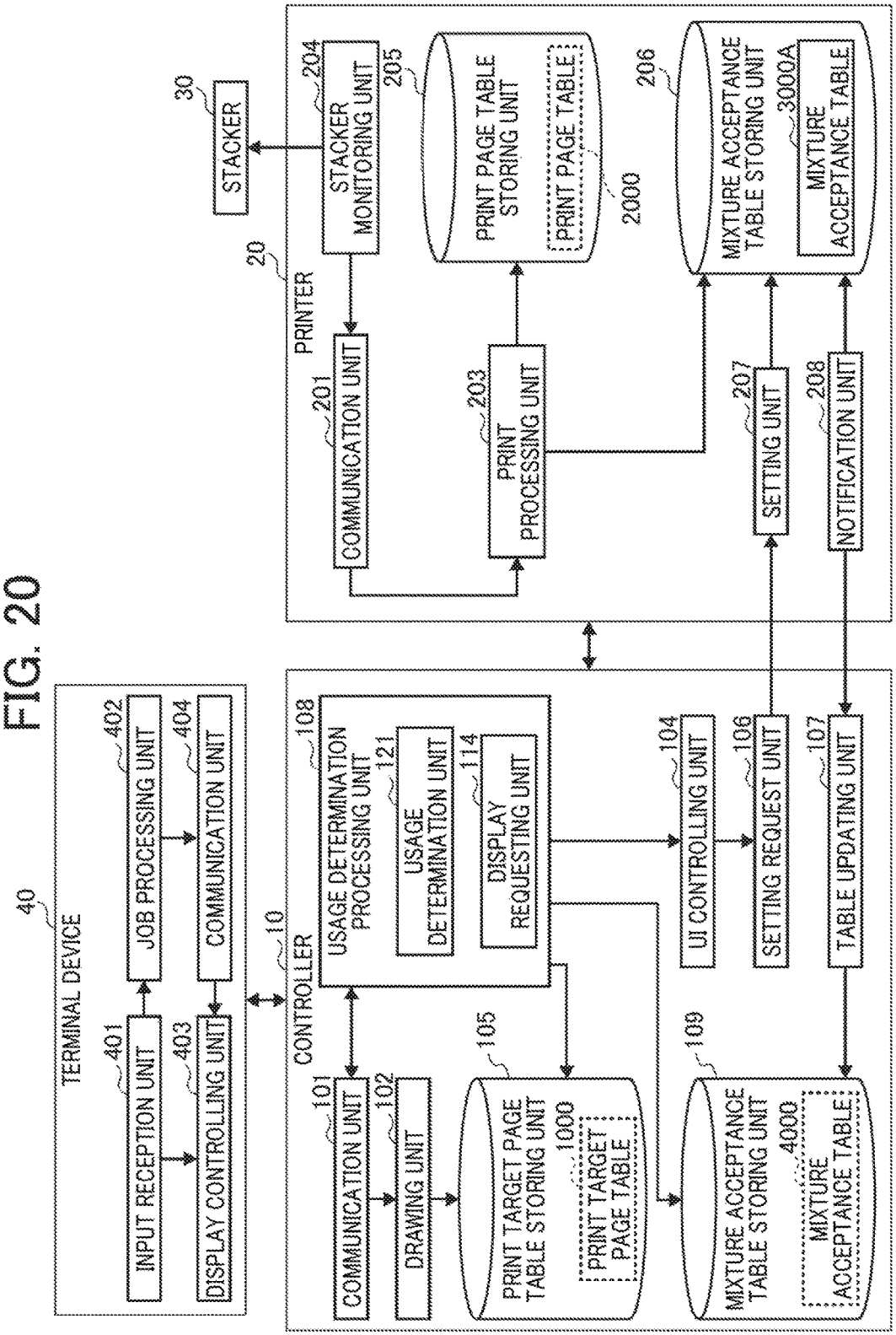
FIG. 20 is a diagram of an exemplary function configuration of a controller, a printer, and a terminal device according to a third embodiment.

First, a function configuration of a controller 10, a printer 20, and a terminal device 40 according to the present embodiment is described with reference to FIG. 20. FIG. 20 is a diagram of an exemplary function configuration of a controller, a printer, and a terminal device according to the present embodiment.

As illustrated in FIG. 20, the printer 20 according to the present embodiment does not include a usage response processing unit 202. Also, the printer 20 according to the present embodiment further includes a notification unit 208. For example, the notification unit 208 notifies the controller 10 of paper ejection tray information stored in a mixture acceptance table 3000A at the time of starting the printer 20 and at the time of updating the mixture acceptance table 3000A As illustrated in FIG. 20, the controller 10 according to the present embodiment does not include a usage request processing unit 103. The controller 10 according to the present embodiment further includes a table updating unit 107, a usage determination processing unit 108, and a mixture acceptance table storing unit 109.

The table updating unit 107 updates a mixture acceptance table 4000 stored in the mixture acceptance table storing unit 109 based on the paper ejection tray information notified from the printer 20.

The usage determination processing unit 108 performs processing to use the stacker 30. Here, the usage determination processing unit 108 includes a usage determiner 121 and a display requesting unit 114. The usage determiner 121 determines whether the paper sizes are different from each other, whether the stacker 30 to be the paper ejection destination permits the mixture of the paper sizes, and whether the difference with the paper size of the previous page is within a reference value.

The mixture acceptance table storing unit 109 stores the mixture acceptance table 4000. The table updating unit 107 updates the mixture acceptance table 4000 so that the mixture acceptance table 4000 is synchronized with the mixture acceptance table 3000A stored in the mixture acceptance table storing unit 206 of the printer 20.

Figure 21:
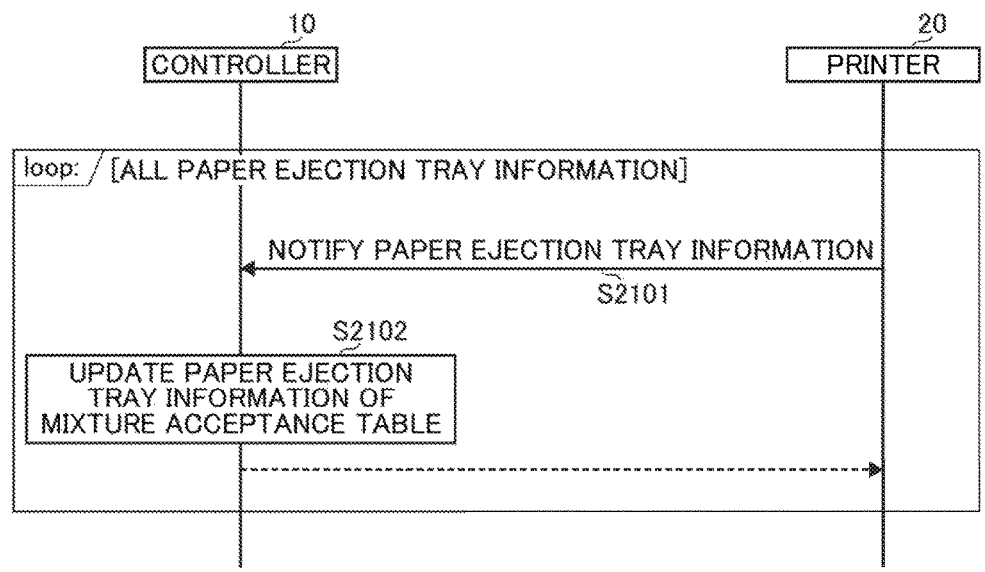
FIG. 21 is a sequence diagram of exemplary updating processing of the mixture acceptance table.

Next, processing of the printing system 1 according to the present embodiment is described in detail. First, processing for synchronizing the mixture acceptance table 4000 stored in the mixture acceptance table storing unit 109 of the controller 10 with the mixture acceptance table 3000A stored in the mixture acceptance table storing unit 206 of the printer 20 is described with reference to FIG. 21. FIG. 21 is a sequence diagram of exemplary updating processing of the mixture acceptance table 4000. The updating processing illustrated in FIG. 21 is performed, for example, when the printer 20 is started and when the mixture acceptance table 3000A is updated.

First, the notification unit 208 of the printer 20 notifies the controller 10 of the paper ejection tray information stored in the mixture acceptance table 3000A stored in the mixture acceptance table storing unit 206 by the communication unit 201 (step S2101).

When the paper ejection tray information is notified by the communication unit 101, the table updating unit 107 of the controller 10 updates the mixture acceptance table 4000 stored in the mixture acceptance table storing unit 109 based on the paper ejection tray information (step S2102).

The printer 20 and the controller 10 performs the processing in steps S2101 and S2102 to all the paper ejection tray information stored in the mixture acceptance table 3000A. For example, by including a flag indicating that the information is the final paper ejection tray information of the paper ejection tray information stored in the mixture acceptance table 3000A in the above notification, the table updating unit 107 can detect the final paper ejection tray information. Alternatively, for example, in a case where the paper ejection tray number included in the paper ejection tray information is a predetermined value, the table updating unit 107 may detect the final paper ejection tray information.

Accordingly, the mixture acceptance table 4000 stored in the mixture acceptance table storing unit 109 of the controller 10 is synchronized with the mixture acceptance table 3000A stored in the mixture acceptance table storing unit 206 of the printer 20

Figure 22:
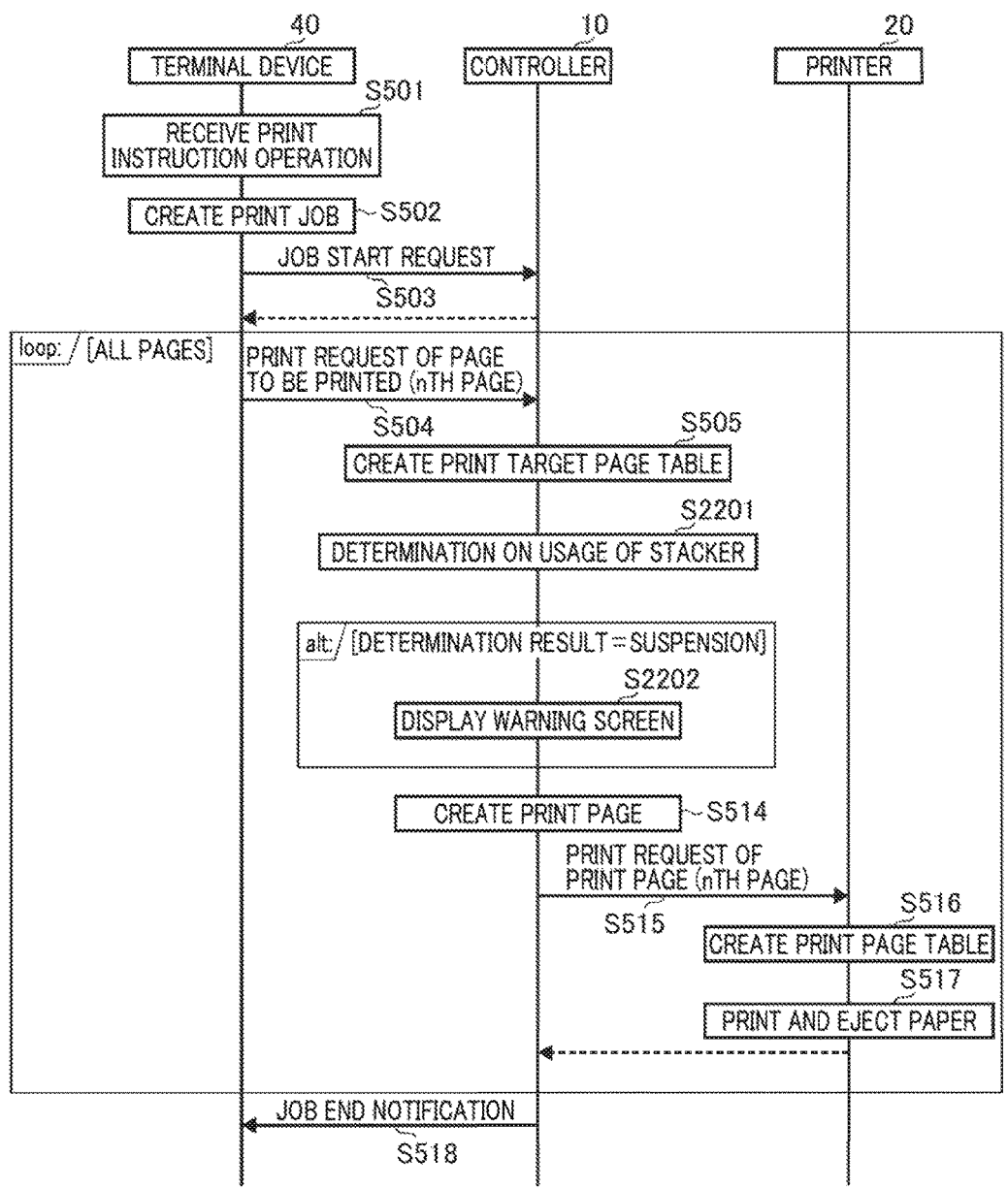
FIG. 22 is a sequence diagram of operation of printing according to an embodiment.

Next, processing for performing printing by the printer 20 by operating the terminal device 40 by the user and creating the print job is described with reference to FIG. 22. FIG. 22 is a sequence diagram of an example of whole processing to perform printing by the printer 20 according to the present embodiment. Since the processing in steps S501 to S505 and S514 to S518 in FIG. 22 is similar to the processing in FIG. 5, the description of the processing is omitted.

Subsequently to step S505, the usage determiner 121 of the controller 10 determines whether paper ejection to the stacker 30 is continued (step S2201). That is, the usage determiner 121 determines whether the paper sizes are different from each other, whether the stacker 30 to be the paper ejection destination permits the mixture of the paper sizes, and whether the difference with the paper size of the previous page is within the reference value. The stacker usage determining processing in this step is described in detail below.

In a case where the determination result of the stacker usage determining processing is "suspension" in step S2201, the UI controlling unit 104 of the controller 10 displays a warning screen similarly to step S512 in FIG. 5 (step S2202).

Here, the stacker usage determining processing in step S2201 in FIG. 22 is described with reference to FIG. 23. FIG. 23 is a flowchart of exemplary stacker usage determining processing.

First, the usage determiner 121 determines whether the page to be printed is the first page (step S2301). That is, the usage determiner 121 determines whether the page to be printed is the first page, for example, by referring to the page ID in the print target page table 1000 created in step S505 in FIG. 22.

In a case where it has been determined in step S2301 that the page to be printed is not the first page, the usage determiner 121 obtains the print target page tables 1000 of the nth page and the n−1th page from the print target page table storing unit 105 (step S2302). That is, the usage determiner 121 obtains the print target page table 1000 corresponding to the nth page to be printed and the print target page table 1000 corresponding to the n−1th page to be printed.

Next, the usage determiner 121 determines whether the paper ejection trays to be used of the nth page and the n−1th page are different from each other (step S2303). That is, the usage determiner 121 determines whether the paper ejection tray to be used in the print target page table 1000 of the nth page and the paper ejection tray to be used in the print target page table 1000 of the n−1th page are different from each other.

In a case where it has been determined in step S2303 that the paper ejection trays to be used of the nth page and the n−1th page are not different from each other, the usage determiner 121 determines whether the paper sizes of the nth page and the n−1th page are different from each other (step S2304). That is, the usage determiner 121 determines whether the paper size in the print target page table 1000 of the nth page and the paper size in the print target page table 1000 of the n−1th page are different from each other.

On the other hand, in a case where it has been determined in step S2303 that the paper ejection trays to be used of the nth page and the n−1th page are different from each other, the usage determiner 121 proceeds the processing to step S2310. In this case, the determination result indicating "continuation" is created.

In a case where it has been determined in step S2304 that the paper sizes of the nth page and the n−1th page are different from each other, the usage determiner 121 obtains the mixture acceptance table 4000 from the mixture acceptance table storing unit 109 (step S2305).

On the other hand, in a case where it has been determined in step S2304 that the paper sizes of the nth page and the n−1th page are not different from each other, the usage determiner 121 proceeds the processing to step S2310. In this case, the determination result indicating "continuance" is created.

Next, the usage determiner 121 determines whether the paper ejection tray to be used included in the print target page table 1000 of the nth page permits the mixture of the paper sizes with reference to the mixture acceptance table 4000 (step S2306).

In a case where it has been determined in step S2306 that the mixture of the paper sizes is not permitted, the usage determiner 121 determines whether a paper width difference is larger than a paper width reference value of the paper ejection tray to be used with reference to the mixture acceptance table 4000 (step S2307). Here, the paper width difference is a difference between the width of the paper size included in the print target page table 1000 of the nth page and the width of the paper size included in the print target page table 1000 of the n−1th page.

On the other hand, in a case where it has been determined in step S2306 that the mixture of the paper sizes is permitted, the usage determiner 121 proceeds the processing to step S2310. In this case, the determination result indicating "continuance" is created.

In a case where it has been determined in step S2307 that the paper width difference is larger than the paper width reference value, the usage determiner 121 proceeds the processing to step S2309. In this case, the determination result indicating "suspension" is created.

On the other hand, in a case where it has been determined in step S2307 that the paper width difference is equal to or less than the paper width reference value, the usage determiner 121 determines whether a paper length difference is larger than a paper length reference value of the paper ejection tray to be used with reference to the mixture acceptance table 4000 (step S2308). Here, the paper length difference is a difference between the length of the paper size included in the print target page table 1000 of the nth page and the length of the paper size included in the print target page table 1000 of the n−1th page.

In a case where it has been determined in step S2308 that the paper length difference is larger than the paper length reference value, the usage determiner 121 creates the determination result indicating "suspension" (step S2309).

On the other hand, in a case where it has been determined in step S2308 that the paper length difference is equal to or less than the paper length reference value, the usage determiner 121 creates the determination result indicating "continuance" (step S2310).

As described above, the controller 10 according to the present embodiment determines whether the paper sizes are different from each other, whether the stacker 30 to be the paper ejection destination permits the mixture of the paper sizes, and whether the difference with the paper size of the previous page is within the reference value.

As described above, in the printing system 1 according to the first embodiment, in a case where the printed matters respectively having the different paper sizes are ejected to the stacker 30 which does not permit the mixture of the paper sizes, the warning screen is displayed on the controller 10 and the terminal device 40 to interrupt the print processing. Therefore, the printing system 1 according to the first embodiment can prevent a state in which the printed matters respectively having different paper sizes are mixed on the stacker 30.

Therefore, according to the printing system 1 according to the first embodiment, for example, an increase in a load for sorting the printed matters of the user which is caused by the mixture of the printed matters respectively having different paper sizes on the stacker 30 can be prevented. Also, according to the printing system 1 according to the first embodiment, for example, generation of a paper jam caused by the mixture of the printed matters respectively having different paper sizes on the stacker 30 can be prevented.

Also, in the printing system 1 according to the second embodiment, even in a case where the printed matters respectively having different paper sizes are ejected to the stacker 30 which does not permit the mixture of the paper sizes, the print processing is not interrupted in a case where the difference with the paper size of the previous page is within a predetermined reference value. Accordingly, the printing system 1 according to the second embodiment can prevent deterioration in the efficiency of the printing work in the printing work in which the paper sizes are often switched can be prevented.

In addition, in the printing system 1 according to the third embodiment, the controller 10 can determine whether the paper sizes are different from each other, whether the stacker 30 to be the paper ejection destination permits the mixture of the paper sizes, and whether the difference with the paper size of the previous page is within the reference value. Accordingly, the printing system 1 according to the third embodiment can reduce a communication load between the controller 10 and the printer 20.

The communication unit 101 is an exemplary receiver. The request determiner 111 is an exemplary determiner. The request creating unit 112 is an exemplary request unit. The UI controlling unit 104 is an exemplary display unit. The drawing unit 102 is an exemplary creation unit.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, in alternative to displaying a warning screen to warn the user that the different paper sizes are mixed, the printing system 1 may warn the user in any other various ways. For example, the printing system 1 may output a sound such as a voice indicating that paper sizes are mixed or a beep sound, through a speaker provided in the printing system 1. Such sound may be previously stored in any desired memory of the printing system 1. In another example, the printing system 1 may cause an alarm lamp, provided in the printing system 1, to be lighted. That is, the printing system 1 may output a notification indicating the mixture of the different medium sizes in various ways.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising:
   a receiver to receive from a terminal device, for each page of an image to be printed with an image processing device, one-page data included in electronic data of the image to be printed; and
   circuitry to:
   determine whether an output destination device to which a print medium having the printed image is output has been changed and whether a medium size of the print medium has been changed to generate a first determination result;
   request the image processing device to determine whether the output destination device permits mixture of different medium sizes to obtain a second determination result when the first determination result indicates that at least one of the output destination device and the medium size has been changed; and
   output a notification when the second determination result indicates that the output destination device does not permit the mixture of the different medium sizes.

2. The information processing apparatus according to claim 1, wherein the circuitry controls a display to display a warning screen as the notification.

3. The information processing apparatus according to claim 2, wherein
   the circuitry requests the image processing device to determine whether the output destination device has been changed, and generates the first determination result according to a response from the image processing device.

4. The information processing apparatus according to claim 3, wherein
   the circuitry further requests the image processing device to determine whether a difference in change of the medium size is within a predetermined reference value to generate a third determination result, and
   outputs the notification when the third determination result indicates that the difference is not within the predetermined reference value.

5. The information processing apparatus according to claim 2, wherein the circuitry is further configured to:
   generate a print target page table in response to receiving the one-page data representing the page to be printed, the print target page table including a page number of the page to be printed, information indicating the output destination device to which the print medium is output, and information indicating a medium size of the print medium, and
   determine whether the output destination device has been changed and whether the medium size has been changed with reference to a first print target page table generated for the page to be printed, and a second print target page table generated for a previous page previous to the page to be printed.

6. The information processing apparatus according to claim 2, wherein
the receiver receives the one-page data representing the page to be printed from the terminal device, and
the circuitry causes the terminal device to stop transmission of the electronic data representing the page to be printed, when the second determination result indicates that the output destination device does not permit the mixture of different medium sizes.

7. The information processing apparatus according to claim 2, wherein
the circuitry transmits a request including the information indicating the output destination device to which the print medium is output and the information indicating a medium size of the print medium, to the image processing device to request the first determination or the second determination.

8. The information processing apparatus according to claim 2, wherein the circuitry displays the warning screen on the terminal device.

9. The information processing apparatus according to claim 1, wherein the circuitry controls at least one of a speaker that outputs a sound, and a light to turn on an alarm lamp, to output the notification.

10. The information processing apparatus according to claim 1, wherein
the image processing device is a production printer, and
the output destination device is a stacker device.

11. An information processing system, comprising an information processing apparatus and an image processing device, the system comprising:
a receiving unit from a terminal device, for each page of an image to be printed, one-page data included in electronic data of the image to be printed;
a first determiner to determine whether an output destination device to which a print medium having the printed image is output has been changed and whether a medium size of the print medium has been changed to generate a first determination result;
a second determiner to determine whether the output destination device permits mixture of different medium sizes to obtain a second determination result when the first determination result indicates that at least one of the output destination device and the medium size has been changed; and
an output unit to output a notification when the second determination result indicates that the output destination device does not permit the mixture of the different medium sizes.

12. An information processing method comprising:
receiving from a terminal device, for each page of an image to be printed with an image processing device, one-page data included in electronic data of the image to be printed;
determining whether an output destination device to which a print medium having the printed image is output has been changed and whether a medium size of the print medium has been changed to generate a first determination result;
requesting the image processing device to determine whether the output destination device permits mixture of different medium sizes to obtain a second determination result when the first determination result indicates that at least one of the output destination device and the medium size has been changed; and
outputting a notification when the second determination result indicates that the output destination device does not permit the mixture of the different medium sizes.

* * * * *